United States Patent
Matei et al.

(10) Patent No.: US 12,204,574 B2
(45) Date of Patent: *Jan. 21, 2025

(54) PARTITIONING DOCUMENTS FOR CONTEXTUAL SEARCH

(71) Applicant: Oracle International Corporation, Redwood Shores, CA (US)

(72) Inventors: Liviu Sebastian Matei, Bucharest (RO); Filippo Beghelli, London (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,293

(22) Filed: Apr. 12, 2024

(65) Prior Publication Data
US 2024/0354323 A1    Oct. 24, 2024

Related U.S. Application Data

(63) Continuation of application No. 18/303,943, filed on Apr. 20, 2023, now Pat. No. 11,983,209.

(51) Int. Cl.
*G06F 16/33* (2019.01)
*G06F 16/31* (2019.01)
*G06F 16/338* (2019.01)

(52) U.S. Cl.
CPC ........ *G06F 16/3347* (2019.01); *G06F 16/313* (2019.01); *G06F 16/338* (2019.01)

(58) Field of Classification Search
CPC ... G06F 16/3347; G06F 16/313; G06F 16/338
See application file for complete search history.

(56) References Cited

U.S. PATENT DOCUMENTS

| 7,725,484 | B2  | 5/2010  | Nister et al. |
| 2007/0233656 | A1* | 10/2007 | Bunescu ............... G06F 40/295 |
| 2019/0236167 | A1  | 8/2019  | Hu et al. |

(Continued)

OTHER PUBLICATIONS

Devlin et al., "BERT: Pre-training of Deep Bidirectional Transformers for Language Understanding", May 24, 2019, pp. 16.

(Continued)

*Primary Examiner* — Cam Y T Truong
(74) *Attorney, Agent, or Firm* — Invoke

(57) ABSTRACT

Operations of a search management system are disclosed. The operations may include: identifying a data corpus containing a plurality of documents, generating sets of feature vectors representing the plurality of documents, receiving a query to search the data corpus, generating a query vector for the query, identifying a target feature vector that meets a similarity threshold by comparing the query vector to the feature vectors, and presenting a query result that includes at least part of the document. The feature vectors may be generated by executing a multi-step partitioning process for partitioning a respective document into a plurality of document partitions, such that the sets of feature vectors that are generated correspond to the plurality of document partitions for the respective document. The query result may include a target partition from among the plurality of document partitions represented by the target feature vector.

20 Claims, 14 Drawing Sheets

(56) References Cited

U.S. PATENT DOCUMENTS

2022/0207065 A1* 6/2022 Yegorin ............... G06F 40/279
2022/0350828 A1* 11/2022 Ma ..................... G06F 16/3347

OTHER PUBLICATIONS

Gustavo., "Opensearch k-NN," Opster, Oct. 30, 2022, Retrieved from https://opster.com/guides/opensearch/opensearch-machine-learning/opensearch-knn/, pp. 18.

K-nearest neighbor (kNN) search, Elastic, Retrieved from https://www.elastic.co/guide/en/elasticsearch/reference/master/knn-search.html#knn-search, May 2, 2023, pp. 12.

Kiros. R. et al., "Skip-Thought Vectors," NIPS, 2015, pp. 9.

Mueller et al., "Siamese Recurrent Architectures for Learning Sentence Similarity", Proceedings of the Thirtieth AAAI Conference on Artificial Intelligence (AAAI-16), 2016, pp. 2786-2792.

Reimeres et al., "Sentence-BERT: Sentence Embeddings using Siamese BERT-Networks", Proceedings of the 2019 Conference on Empirical Methods in Natural Language Processing and the 9th International Joint Conference on Natural Language Processing, 2019, pp. 3982-3992.

Script score query, Retrieved from https://www.elastic.co/guide/en/elasticsearch/reference/7.6/query-dsl-script-score-query.html#vector-functions, Apr. 28, 2023, pp. 17.

Tibshirani J., "Text similarity search with vector fields", Retrieved from https://www.elastic.co/blog/text-similarity-search-with-vectors-in-elasticsearch, Aug. 27, 2019, pp. 6.

\* cited by examiner

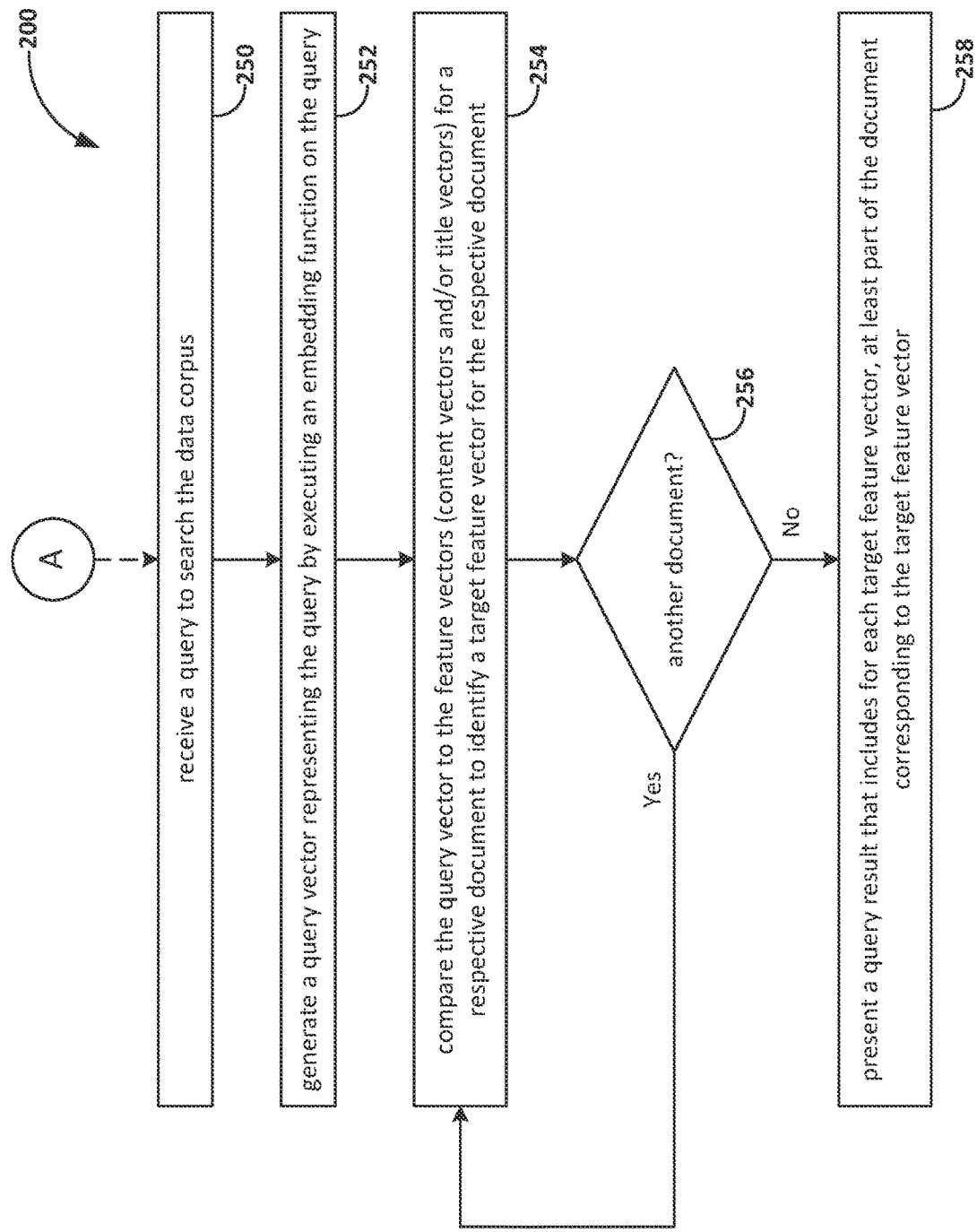

PARTITIONING DOCUMENTS FOR CONTEXTUAL SEARCH

INCORPORATION BY REFERENCE; DISCLAIMER

Each of the following applications are hereby incorporated by reference: application Ser. No. 18/303,943 filed on Apr. 20, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to document search systems, and more particularly, to contextual search systems that utilize contextual embeddings to index and search for documents.

BACKGROUND

A document search system may search a data corpus that includes a set of documents. The data corpus can be searched for content that matches a query, and a query result can be returned in response to the query. The query result may include content from the documents that matches the query. By way of example, a query may present a question, and the data corpus may include documents that make up a knowledge base that may include an answer to the question presented in the query.

The content of this background section should not be construed as prior art merely by virtue of its presences in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 2A-2C illustrate example operations that may be performed by the system in accordance with one or more embodiments;

DETAILED DESCRIPTION

Figure 1A:
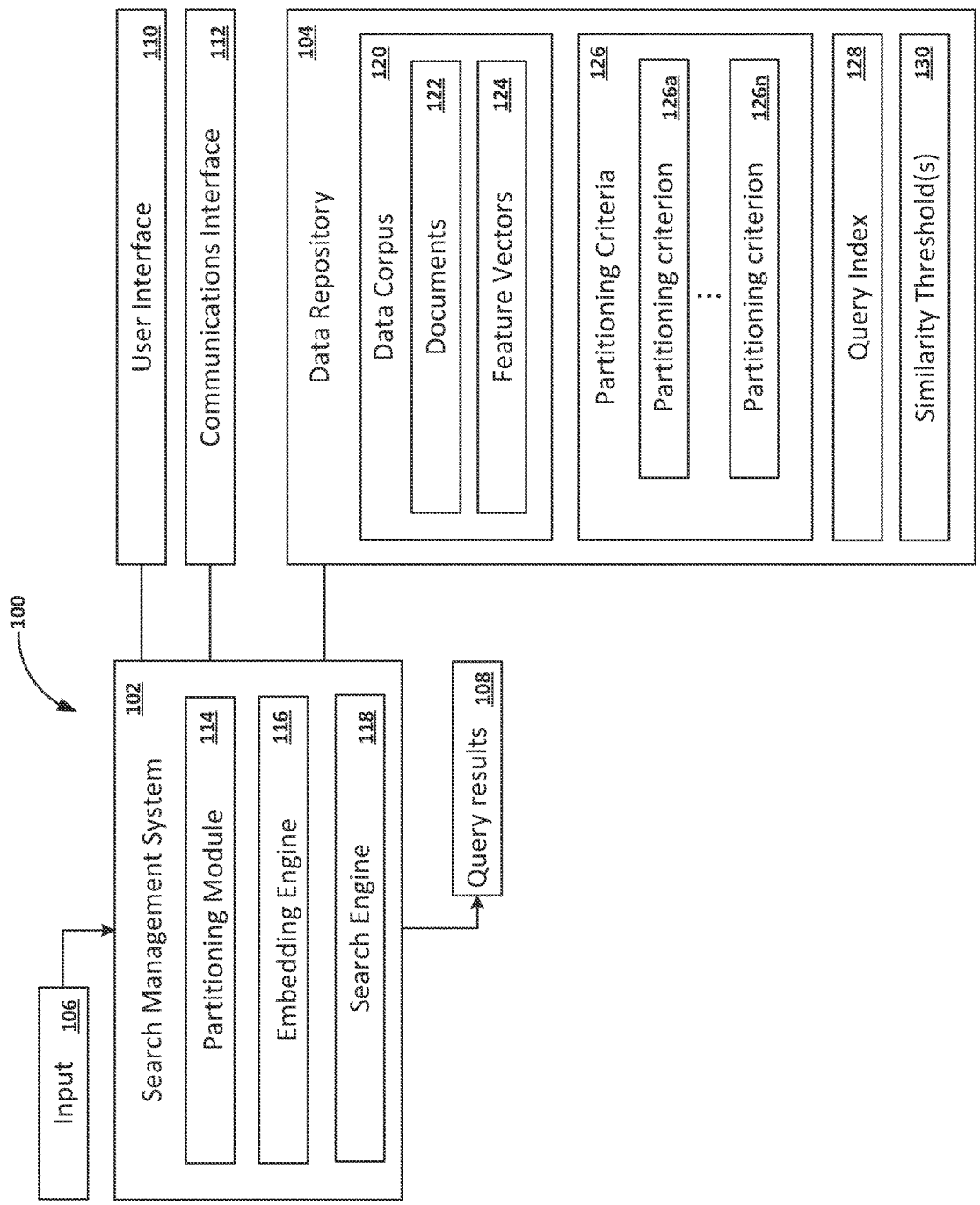
FIG. 1A illustrates a system that includes a search system and a data corpus in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DOCUMENT SEARCH SYSTEM
3. SYSTEM OPERATIONS
4. HARDWARE OVERVIEW
5. COMPUTER NETWORKS AND CLOUD NETWORKS
6. MISCELLANEOUS; EXTENSIONS

1. General Overview

One or more embodiments enable an improvement in semantic searches. The system executes a multi-step partitioning process to partition each document, in a data corpus, to generate a corresponding set of document partitions. The system limits the size of each partition to a particular size (for example, thirty words) to improve a likelihood of capturing contextually meaningful content in each document partition. The system then generates a feature vector for each document partition. When a request for a query is received, the system compares (a) a target feature vector representing the query to (b) feature vectors representing the document partitions for each document. Based on the comparison, the system selects the document partitions that are to be presented in response to the query. The system may present particular document partitions or present the documents that include those particular document partitions.

This General Overview section is intended to provide a general overview without addressing all aspects of the present disclosure. The full scope of the presently disclosed subject matter is understood from the content of the present disclosure in its entirety.

2. Contextual Document Search System

One or more embodiments implement a search management system that utilizes contextual embeddings to perform search queries. The search management system performs the search queries based on semantics or context of content in documents.

The search management system may generate searchable content in a data corpus by executing a multi-step partitioning process to partition documents into sets of document partitions. The multi-step partitioning process allows document partitions to be generated for a respective document that represents contextually-meaningful pieces of content from the document. The system then generates sets of feature vectors that represent the respective sets of document partitions. The feature vectors are a contextually-meaningful representation of the document partition based on, for example, the contextually-meaningful characteristic of the document partitions.

Feature vectors for queries received by the system may be searched against the feature vectors. Because the feature vectors are a contextually-meaningful representation of the document partitions generated by the system, the contextual meaning of a query may have an increased likelihood of aligning with corresponding contextual meaning represented by a respective feature vector.

The system may select a size limit for the document partitions to improve a likelihood of capturing contextually-meaningful content within respective document partitions. A size limit that is too small may partition contextually related content in separate document partitions, which may compromise the contextual meaning of the respective document partitions. A size limit that is too large may dilute contextually-meaningful content with other content that may have a lesser degree of relevance. A properly selected size limit may balance these considerations providing enough content to yield document partitions that possess contextual meaning, without diluting the contextual meaning with other content. The dimensions of the feature vectors may be selected to adequately represent the contextual meaning of the document partitions, while maintaining satisfactory processing speed. Feature vectors that do not have enough dimensions may not sufficiently represent the contextual meaning of the document partitions. Excessive dimensions of a feature vectors may come at the cost of increased processing requirements while providing diminishing returns with respect to their contribution to the contextual meaning of the document partitions. By carefully selecting the size limit of the document partitions and the number of dimensions of the feature vectors, the system can generate good query results with the desired contextual alignment to queries while maintaining a balance with required processing capacity of the system.

The search management system may generate query results that have an improved contextual alignment between the queries and the query results. In an example, a query includes a question, and a query result is intended to include an answer to the question. The contextually-meaningful representation of the document partition generated by the system may give an improved likelihood that the query result actually answers the questions. By contrast, a query result that lacks contextual alignment may include text or other content that matches the query, but that may be taken out of context and/or that may not actually answer the question presented in the query.

The presently disclosed search management system advantageously generates query results that may have improved quality and/or expediency, attributable at least in part to the contextual alignment attributable at least in part to the partitioning process utilized to generate contextually meaningful document partitions. These improvements in quality and/or expediency may be particularly advantageous in the field of customer service. For example, a service representative may receive a question from a customer and may utilize the search management system to input a query based on the customer's question. The service representative may receive a query result that includes contextually responsive answer to the question represented by the query, thereby allowing the service representative to answer the customer's question quickly and accurately. Similarly, these improvements in quality and/or expediency may be advantageous for self-help question-and-answer systems, such as for technical support or the like.

Figure 1B:
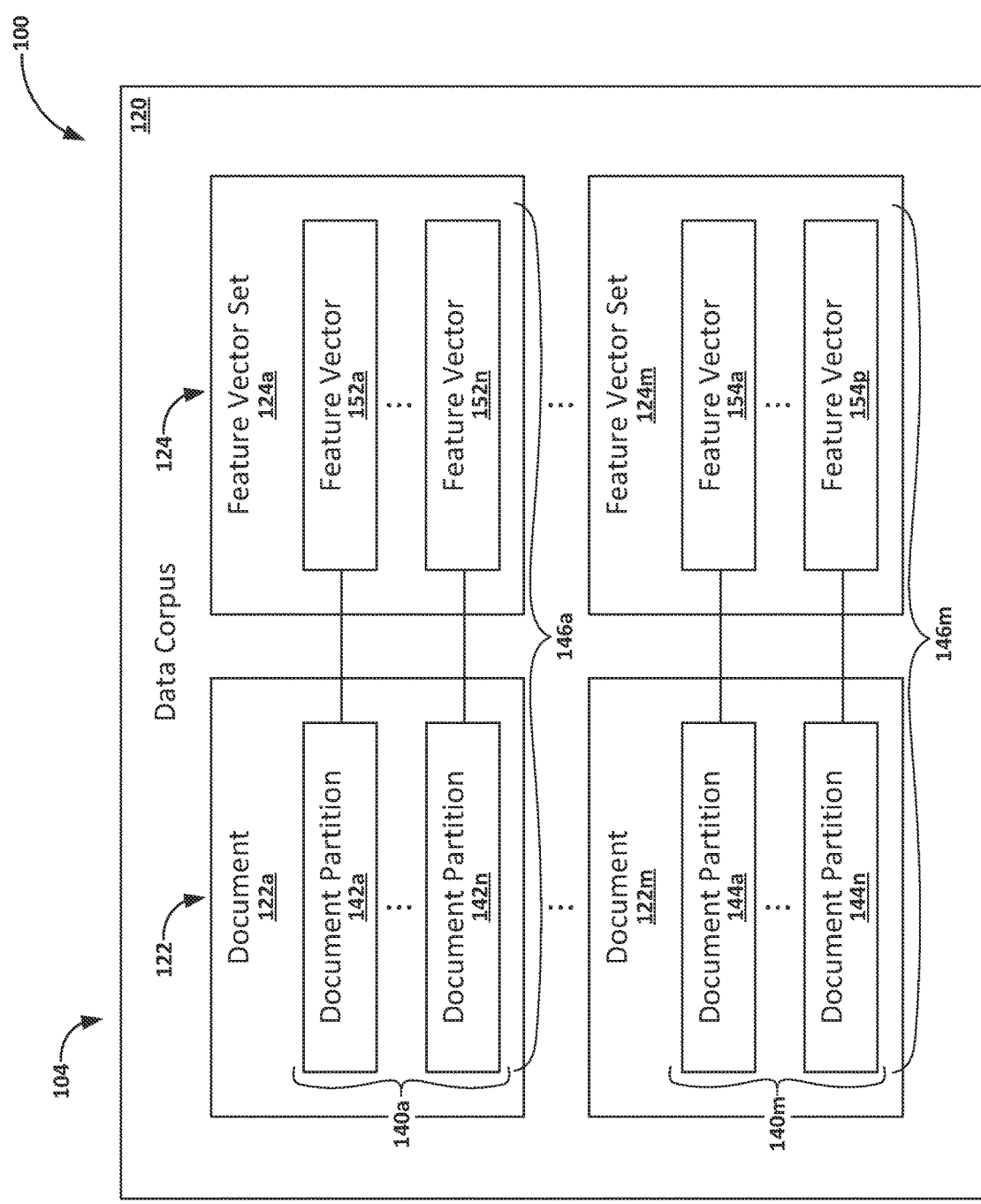
FIG. 1B illustrates features of a data corpus in accordance with one or more embodiments.

Referring now to FIGS. 1A and 1B, the presently disclosed subject matter is further described. As shown in FIG. 1A, a system 100 in accordance with one or more embodiments may be associated with document search operations, and more particularly contextualized document search operations that utilize contextual embeddings to index and search for documents. The system 100 may be utilized to perform operations in accordance with the present disclosure, including generating document partitions and feature vectors for the document partitions and storing them in a data corpus, and searching the data corpus in response to queries and returning query results that match the queries.

The system 100 may include a search management system 102 and a data repository 104 communicatively coupled or couplable with one another. The search management system 102 may include hardware and/or software configured to carry out various operations in accordance with the present disclosure. The data repository 104 may include data utilized and/or stored by the search management system 102 in association with carrying out various operations.

The search management system 102 may receive inputs 106 from various sources and may generate outputs 108 to various sources. For example, the inputs 106 may include queries upon which the search management system 102 may execute search operations, and the outputs 108 may include query results generated by the search management system 102. Additionally, or in the alternative, the inputs 106 may include data from the data repository 104 and/or data transmitted to the search management system 102 from a source, such as data to be utilized by the search management system 102 for various operations, and/or data to be stored in the data repository 104. Additionally, or in the alternative, the outputs 108 may include data to be stored in the data repository 104 and/or data to be transmitted to a source, such as responsive to operations performed by search management system 102. By way of example, the source may include an external resource utilized by the search management system 102.

The system 100 may include a user interface 110 communicatively coupled or couplable with the search management system 102 and/or the data repository 104. The user interface may include hardware and/or software configured to facilitate interactions between a user and the search management system 102 and/or the data repository 104.

The system 100 may include a communications interface 112 communicatively coupled or couplable with the search management system 102 and/or the data repository 104. The communications interface 112 may include hardware and/or software configured to transmit data to and/or from the system 100, and or between respective components of the system 100. For example, the communications interface 112 may transmit and/or receive data between and/or among the search management system 102, the data repository 104, the user interface 110, including transmitting and/or receiving inputs 106 and/or outputs 108.

As shown in FIG. 1A, the search management system 102 may include one or more of: a partitioning module 114, an embedding engine 116, or a search engine 118. In one example, the search management system 102 may include a partitioning module 114 and an embedding engine 116, and the search engine 118 may be provided as an external resource. Additionally, or in the alternative, an embedding engine 116 may be provided as an external resource.

The partitioning module 114 may include hardware and/or software configured to perform various partitioning operations or functions. The partitioning module 114 may be configured to perform a multi-step partitioning process for partitioning a document into a plurality of document partitions. The partitioning module 114 may perform a first partitioning operation that partitions a particular document into a plurality of sections based on a first partitioning criteria. The partitioning module 114 may perform a second partitioning operation that partitions a section of the plurality of sections into a plurality of sub-sections based on a second partitioning criteria that is different than the first partitioning criteria.

In one example, partitioning module initially partition a document into paragraphs defined by the documents in a first partitioning operation. The partitioning module then partitions the paragraphs into document partitions with additional partitioning operations. The paragraphs are partitioned into document partitions such that each of the document partitions meet certain partition criteria (e.g., partitioning criterion 126a to partitioning criterion 126n. A partition criterion may specify that sentences may not be split across partitions. A partition criterion may specify a maximum number of words n that may be included in each partition. In one example, the maximum number of words n may be exceeded in the situation when the length of a single sentence exceeds n words.

The embedding engine 116 may include hardware and/or software configured to perform various embedding operations or functions, including generating feature vectors 124 representing document partitions and/or queries. As used herein, the term "feature vector" refers to an n-dimensional vector of numerical features that describes some object. A feature vector may represent contextually meaningful content in a document. The embedding engine 116 may be configured to execute an embedding function on each of a set of document partitions of a document to generate a respective set of feature vectors 124. In one example, feature vectors 124 may include content vectors and/or title vectors. The term "content vector" refers to a feature vector 124 corresponding to the content of a document partition. A content vector may represent contextually-meaningful content in a document partition. The term "title vector" refers to a feature vector 124 corresponding to the title of a document. A title vector may represent contextually-meaningful content in a title of a document. The embedding engine 116 may be configured to execute an embedding function on a query to generate a feature vector 124 for the query (also referred to herein as a "query vector"). A query vector may represent contextually-meaningful content in a query. An embedding function executed on document partitions may be the same or different from an embedding function executed on a query.

In one example, the feature vectors 124 may have a number of vector dimensions of from 250 dimensions to 500 dimensions, such as from 350 dimensions to 400 dimensions, or such as from 370 to 380 dimensions. In one example, the document partitions resulting from the partitioning process may have a size limit resulting in a word count that corresponds to a partition dimensioning-ratio represented by the relationship: w/d, where "w" represents a word count corresponding to the size limit (e.g., an actual word count or an equivalent word count), and where "d" represents the number of dimensions of the feature vectors 124. The partition dimensioning-ratio may be from about 2.5 to about 20, such as from about 2.5 to about 5, such as from about 10 to about 20, or such as from about 12 to 14. By way of example, a size limit of 30 words and a feature vector that has 375 dimensions has a partition dimensioning-ratio of 12.5.

The search engine 116 may include hardware and/or software configured to perform various search operations or functions. The search engine 116 may compare a query vector to feature vectors in a set of feature vectors to identify a target feature vector from the set of feature vectors that meets a similarity threshold with the query vector. The target feature vector may represent a target partition from a set of document partitions that is determined to have a degree of similarity with the query as represented by the feature vector corresponding to the target partition meeting the similarity threshold with the query vector. The search engine may identify a target feature vector corresponding to a target partition for each of a plurality of documents. For example, the search engine 116 may identify a first target feature vector that is one of a first set of feature vectors that represents a first document of the plurality of documents. Additionally, or in the alternative, the search engine 116 may identify a second target feature vector that is one of a second set of feature vectors that represents a second document of the plurality of documents.

In addition, or in the alternative, to identifying target feature vectors, the search engine 116 may present query results in response to the query. The query results may include at least a portion of the documents corresponding to target feature vectors. For a respective target feature vector, the query result may include at least part of the document corresponding to the target feature vector. For example, the query result may include at least one of: the target partition, one or more additional document partitions, or the whole document. Additionally, or in the alternative, the query result may include for a particular document, at least one of: a title for the particular document, at least a portion of the particular document, or a hyperlink to the particular document. The content of a query result may be ranked, and/or may be presented in a ranked order, for example, based on values of the target vectors corresponding to the content in of the query result.

Referring further to FIG. 1A, the system 100 may include a data repository 104. In one or more embodiments, a data repository 104 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, a data repository 104 may be implemented or may execute on the same computing system as the search management system 102. Alternatively, or additionally, a data repository 104 may be implemented or executed on a computing system separate from the document search management system 102. A data repository 104 may be communicatively coupled to the search management system 102 via a direct connection or via a network.

In an embodiment, the data repository 104 includes a data corpus 120. The data corpus 120 may include a plurality of documents 122, and for respective documents, a set of document partitions and corresponding set of feature vectors. The data corpus 120 or a portion thereof may be generated by the partitioning module 114 executing one or more partitioning processes for partitioning documents into a plurality of document partitions. The data repository 104 may include partitioning criteria 126. The partitioning module 114 may reference the partitioning criteria 126, for example, when executing a partitioning process. The plurality of partitioning criteria may respectively correspond to a particular partitioning operation.

In one example, the data repository 104 may include a query index 128. The query index 128 may include one or more queries and/or query vectors stored in the data repository 104 for current for future use. In one example, the data repository 104 may include a plurality of queries and/or query vectors, such as queries submitted by the user interface 110 and/or query vectors generated from the queries, that may be referenced by the search engine 118 and/or other portions of the search management system 102. The data repository 104 may include a similarity threshold(s) 130. The search engine 118 may reference the query index 128 and/or the similarity threshold(s) 130, for example, when performing search operations or functions, such as identifying target feature vectors that meet a similarity threshold with a query vector.

Referring to FIG. 1B, an example data corpus 120 illustrates a mapping between partitions of a document 122 and feature vectors 124. A set of document partitions 140 and a corresponding set of feature vectors 124 representing the set of document partitions 140 may sometimes be referred to collectively as an "embedding set." Each document 122 has been partitioned to generate a set of document partitions 140 corresponding to the respective document 122. Each document partition, of a set of document partitions 140 corresponding to a document 122, is mapped to a corresponding feature vector of a set of feature vectors 124 associated with the document 122. In the illustrated example, document 122a is represented by feature vector set 124a. Document partitions 142a . . . 142n, of document 122a, are represented by feature vectors 152a . . . 152n of feature vector set 124a. Similarly, document 122m is represented by feature vector set 124m. Document partitions 144a . . . 144p, of document 122m, are represented by feature vectors 154a . . . 154p of feature vector set 124m. A set of document partitions 140 and a corresponding set of feature vectors 124 represent an embedding set 146. Document partitions 142a . . . 142n and corresponding feature vectors 152a. 152n represent embedding set 146a. Document partitions 144a . . . 142n and corresponding feature vectors 154a . . . 154p represent embedding set 146m.

In an example, the data repository 104 includes a query index 128. The query index 128 may include one or more query vectors respectively corresponding to a query.

3. System Operations

Figure 2A:
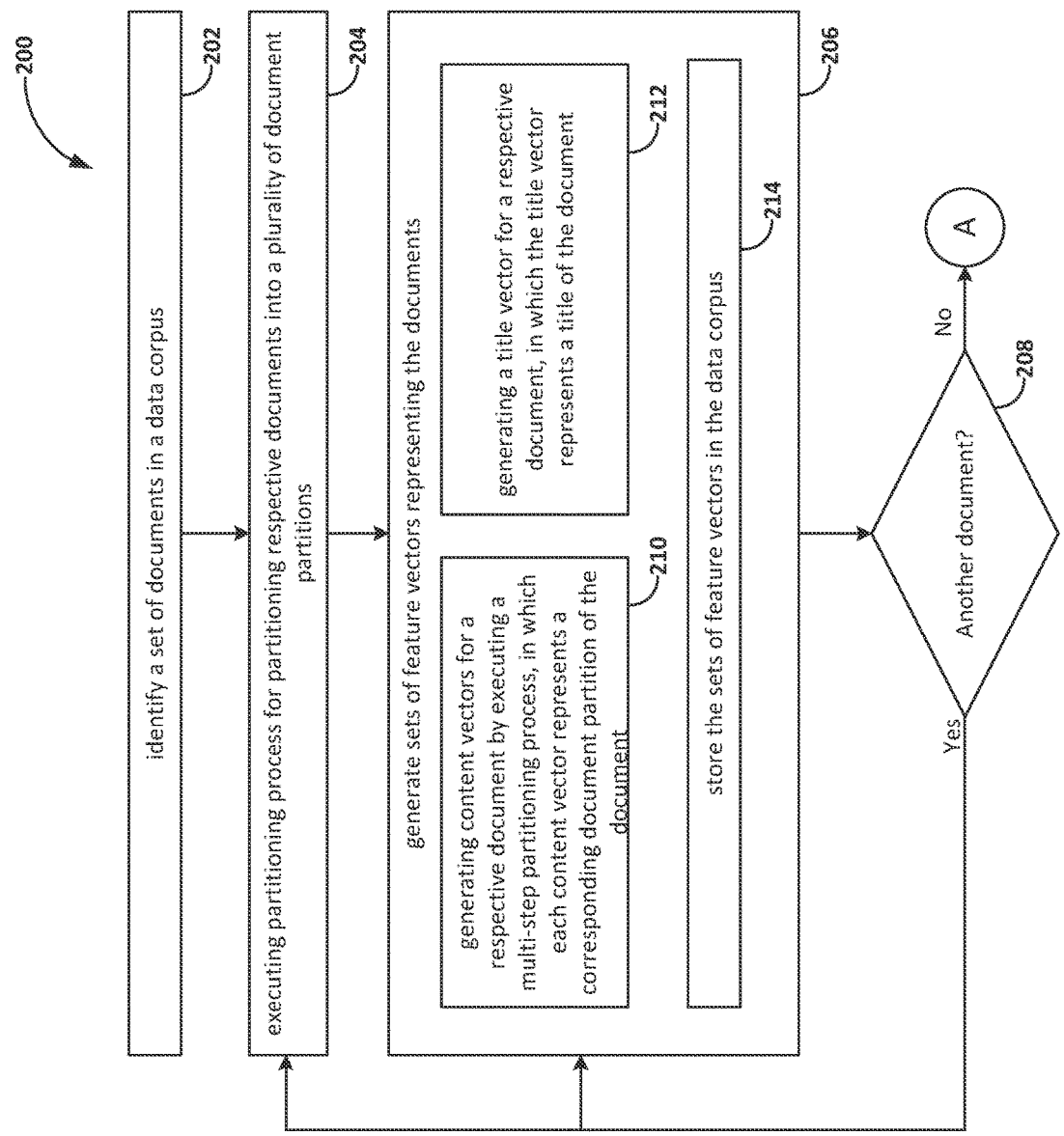
Figure 2B:
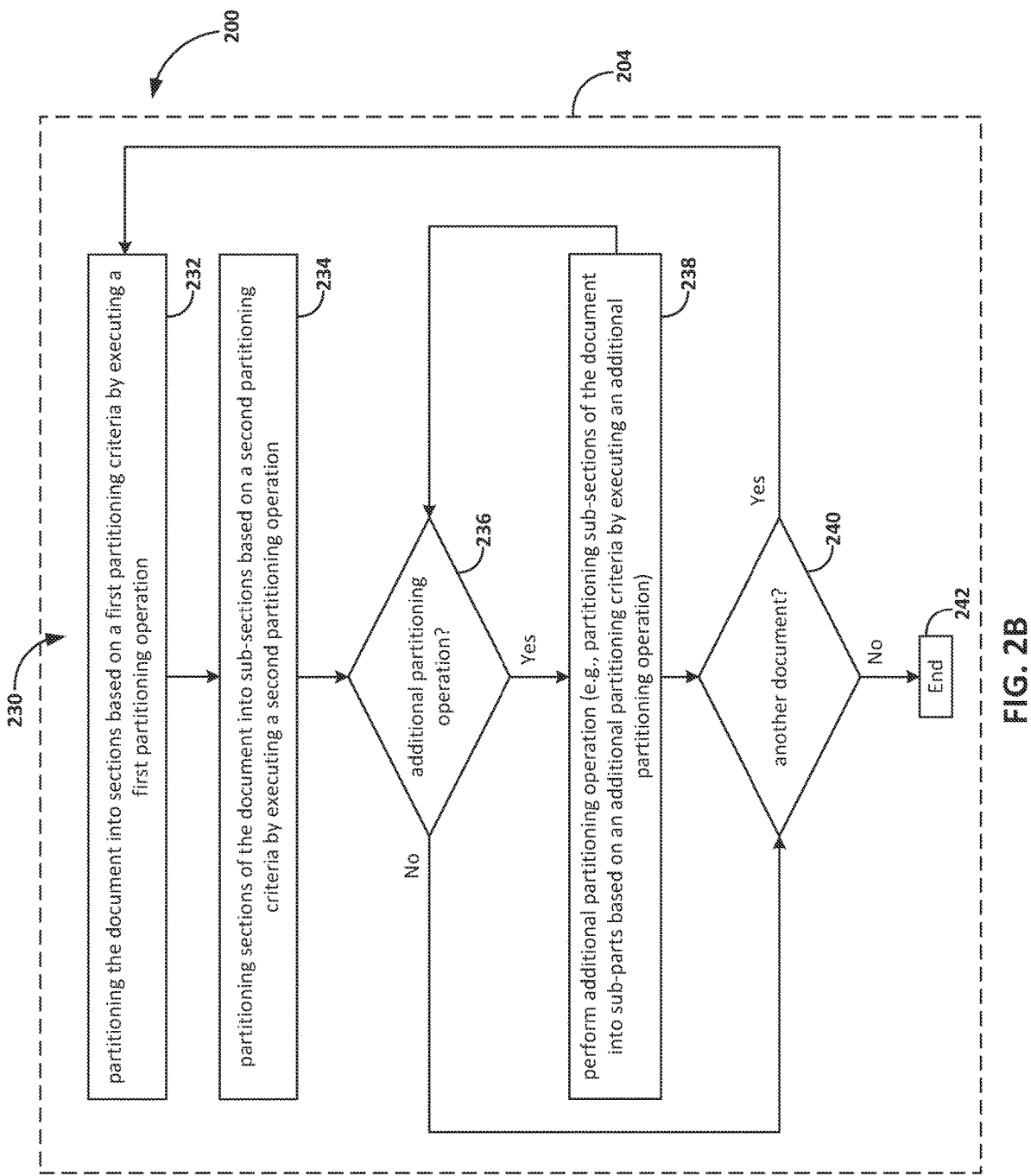

Referring now to FIGS. 2A-2C, the presently disclosed subject matter is further described. The presently disclosed system 100 may perform operations 200. The operations 200 may be associated with the search management system 102. Various components of the system 100 may be utilized to perform the operations 200. The operations 200 may include one or more of: storing documents 122 in the data repository 104, identifying documents 122 in a data repository 104, executing partitioning operations for partitioning respective documents 122 into sets of document partitions 140, generating sets of feature vectors 124 representing the documents 122, receiving queries to search the data repository 104, generating query vectors representing the queries by executing embedding functions, comparing query vectors to sets of feature vectors 124 to identify a target feature vector for respective sets of document partitions 140, or presenting query results in response to queries.

In one example, the operations 200 described with reference to FIG. 2A may include a multi-step partitioning process described with reference to FIG. 2B. In one example, the operations 200 described with reference to FIG. 2C may include query operations, such as an embedding function executed upon a query and/or a search executed by a search engine 118. The operations 200, such as those described with reference to FIGS. 2A-2C, may be performed sequentially or concurrently, for example, with respect to various documents and/or queries.

As shown in FIG. 2A, the system identifies a set of documents in a data repository, at block 202. The system 100 may identify the set of documents by reference to file extensions for the documents.

At block 204, the operations 200 may include executing a partitioning process for partitioning respective documents into a plurality of document partitions 140. In one example, the partitioning process may include a multi-step partitioning process, such as described with reference to FIG. 2B. Additionally, or in the alternative, the operations may include a different partitioning process, such as a one-step partitioning process. The partitioning process (e.g., the multi-step partitioning process) may include at least one of: fixed-length partitioning, section-based partitioning, clustering-based partitioning, or topic-based partitioning. In one example, a partitioning process that utilizes topic modeling may identify the main topics in the text and partition the document accordingly, for example, based on Latent Dirichlet Allocation (LDA) and/or Non-negative Matrix Factorization (NMF).

At block 206, the operations 200 may include generating sets of feature vectors representing the documents. A respective set of feature vectors may include a plurality of feature vectors that each represent a particular document partition of a corresponding set of document partitions. The feature vectors may be generated by the embedding engine of the search management system. The embedding engine may include an API configured to load document partitions 140, process the text in the document partitions, and apply the appropriate models to be used when executing the selected embedding functions.

The one or more embedding function may utilize an embedding model that includes one or more of: a masked language model, a deep contextualized word representations model, a sentence encoding model, a universal sentence encoder model, or a universal sentence representations model. An example masked language model may include or may be based at least in part on: BERT, Sentence-BERT, or Sentence Transformers. An example masked language model may modify a pre-trained model, such as a pre-trained BERT. The modification of the masked language model may include use of siamese and/or triplet network structures. An example deep contextualized word representations model may include or may be based at least in part on ELMo. An example universal sentence encoder model may include or may be based at least in part on Universal Sentence Encoder. An example universal sentence representations model may include or may be based at least in part on InferSent.

At block 208, the operations 200 may include determining whether there are additional documents in the data repository upon which operations are to be performed. The system may determine whether there are additional documents by counting files in the data repository, checking the size of the data repository or a portion thereof, or using an appropriately configured API.

When there is another document, the system may proceed with partitioning the document into a plurality of document partitions at block 204, such as with a multi-step partitioning process. Additionally, or in the alternative, when the document has already been partitioned, such as at block 204, the system may proceed with generating a set of feature vectors representing the document at block 206. In one example, the operations 200 may temporally conclude when the system determines that there are no further documents at block 208. In one example, the operations 200 may continue, such as with further operations described with reference to FIG. 2C.

Referring still to FIG. 2A, the operations 200 associated with generating a set of feature vectors, at block 206, may include generating content vectors at block 210 and/or generating title vectors at block 212. Additionally, or in the alternative, the operations 200 may include storing the sets of feature vectors in the data repository, at block 214. At block 210, the system may generate content vectors for a respective document by executing a multi-step partitioning process, in which each content vector represents a corresponding document partition of the document. At block 212, the system may generate a title vector for a respective document, in which the title vector represents the title of the document.

Referring now to FIG. 2B, operations 200 associated with partitioning respective documents into a plurality of document partitions may include a multi-step partitioning process 230. The multi-step partitioning process 230 described with reference to FIG. 2B may be performed, for example, at block 204 (FIG. 2A). In one example, the multi-step partitioning process 230 may include a sequence of any number of partitioning operations. As shown in FIG. 2B, the multi-step partitioning process 230 may include, at block 232, partitioning a document into sections based on a first partitioning criteria by executing a first partitioning operation, and at block 234, partitioning sections of the document into sub-sections based on a second partitioning criteria by executing a second partitioning operation. The first partitioning operation and/or the second partitioning operation may be executed by an appropriately configured API.

At block 236, the operations 200 may include determining whether there is an additional partitioning operation to be performed. The system may determine whether there is an additional partitioning operation by reference to configuration settings, such as configuration settings defined in an API utilized to execute the partitioning operations.

When there is an additional partitioning operation, the system may proceed with further partitioning in accordance with the corresponding additional at block 238. By way of example, an additional partitioning operation may include, at block 238, partitioning sub-sections of the document into sub-parts based on an additional partitioning criteria. The system may cycle through block 236 for a plurality of additional partitioning operations.

At block 240, the operations 200 may include determining whether there are additional documents in the data repository upon which partitioning operations are to be performed. The system may determine whether there are additional documents by reference to API configuration settings that define whether respective documents are to be subjected to a respective partitioning operation.

When there is another document, the system may proceed with the multi-step partitioning process 230, for example, by returning to block 232. Additionally, or in the alternative, the multi-step partitioning process 230 may conclude at block 242 when the system 100 determines that there are no further documents at block 240. In one example, the operations 200 may continue, such as with further operations described with reference to FIG. 2C.

Referring now to FIG. 2C, the operations 200 may include query operations. The query operations may be performed following one or more of the operations 200 described with reference to FIGS. 2A and 2B. Additionally, or in the alternative, the query operations may be performed independently and/or distinctly from the operations 200 described with reference to FIGS. 2A and 2B.

As shown in FIG. 2C, the operations 200 may include, at block 250, receiving a query to search the data repository. The query may be received by the search management system as an input from the user interface and/or the communications interface.

At block 252, the operations 200 may include generating a query vector representing the query by executing an embedding function on the query. The embedding function may be executed by the embedding engine using an API configured to load document partitions, process the text in the document partitions, and apply the appropriate models to be used when executing the selected embedding functions. The embedding function used to generate the query vector representing the query may be the same or different from an embedding function used to generate sets of feature vectors representing the documents.

At block 254, the operations 200 may include comparing the query vector to the feature vectors (e.g., content vectors and/or title vectors) for a respective document to identify a target feature vector for the respective document. The query vector may be compared to the feature vectors using a full-text search engine. In one example, the full-text search engine may utilize a search model that includes at least one of: a nearest neighbor search model, an ensemble learning search model, a support vector machine search model, a relevance vector machine search model, or a linear regression search model. For a search model that includes a nearest neighbor search model, the nearest neighbor search model may include at least one of: a k-nearest neighbors search model, an approximate k-nearest neighbor search model, a script score k-nearest neighbors search model, an E-approximate nearest neighbor search model, a nearest neighbor distance ratio search model, a fixed-radius near neighbors search model, or an all nearest neighbors search model. In one example, the full-text search engine may utilize a synonym filter. Example full-text search engines include: ELASTICSEARCH™, available from Elastic NV, Amsterdam, Netherlands; and APACHE LUCENE™, available from Apache Software Foundation, Wakefield, MA.

In one example, a query result from the full-text search engine may receive an adjusted weighting based on at least one of term frequency or inverse document frequency. For example, the query result corresponding to a particular document may be weighted based on a TF*IDF (term frequency-inverse document frequency) value. The TF*IDF value may increase proportionally relative to the number of times a word appears in the particular document and may be offset by the number of documents in the data repository 104 that contain the word.

At block 256, the operations 200 may include determining whether there are additional documents with respect to which the query vector may be compared to the feature vectors. The system may determine whether there are additional documents by counting files in the data repository, checking the size of the data repository or a portion thereof, or using an appropriately configured API.

When there is another document, the system may proceed with comparing the query vector to the feature vectors for the respective document, for example, by returning to block 254. In one example, when there are no further documents, the system may proceed with presenting a query result, at block 258. The query result may include for each target feature vector, at least part of the document corresponding to the target feature vector. For example, the query result may include the document partition corresponding to the target feature vector, and/or the query result may include the entire document. Additionally, or in the alternative, the query result may include the title of the document. The title may be presented in the query result alone, or together with an additional portion of the document, such as together with at least one partition and/or the entire document.

In one example, the operations 200 may temporally conclude upon having presented the query result. Additionally, or in the alternative, further operations 200 may be performed for additional queries, for example, by returning to block 250, and repeating at least some of the operations described with reference to FIG. 2C.

Figure 3A:
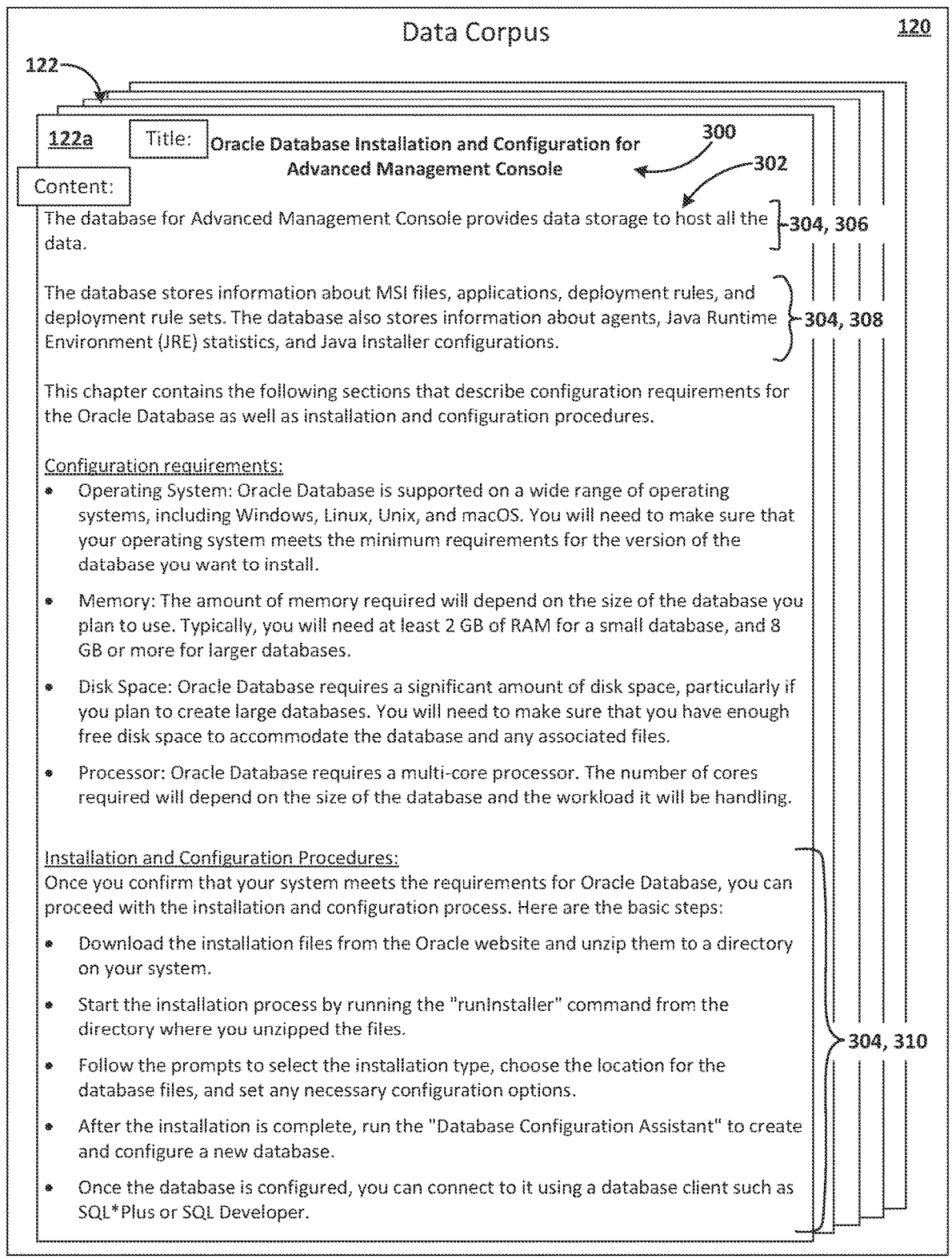
FIG. 3A illustrates a set of documents that may be stored in a data corpus in accordance with one or more embodiments.

Referring now to FIGS. 3A-3J, example embodiments of the presently disclosed subject matter are further described. As shown in FIG. 3A, a data repository 104 may include a plurality of documents 122, including a first document 122a. The plurality of documents 122, including the first document 122a, may respectively include a title 300 and content 302. The content 302 of a document 122 may include a plurality of paragraphs 304. By way of example, the plurality of paragraphs 304 may include a first paragraph 306, a second paragraph 308, and a third paragraph 310.

Figure 3B:
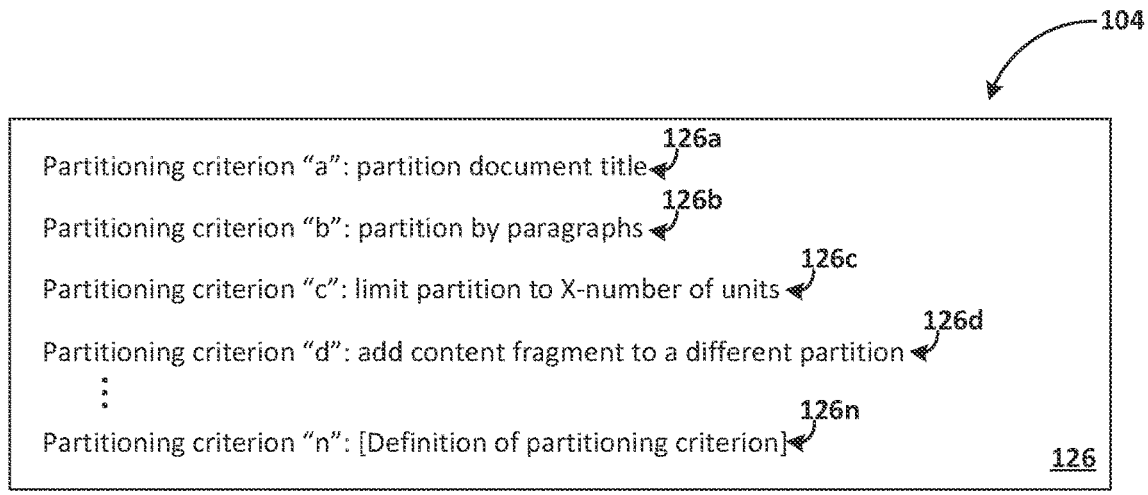
FIG. 3B illustrates example partitioning criteria that may be utilized in a partitioning operation for partitioning documents into document partitions in accordance with one or more embodiments.

The plurality of documents 122 may be partitioned according to one or more partitioning criteria 126. As shown in FIG. 3B, a plurality of partitioning criteria 126 may be housed in the data repository 104. Respective partitioning operations may reference the partitioning criteria 126, for example, to determine partitioning criteria 126 applicable to a particular partitioning operation. The partitioning criteria 126 described herein, including those shown in FIG. 3B, are provided by way of example and without limitation. Further partitioning criteria 126 are contemplated and may be included in operations 200 in addition or in the alternative to those described herein. As shown, example partitioning criteria 126 may be associated with one or more partitioning operations. The partitioning criteria 126 may include, by way of example, at least one of: partitioning criterion "a" 126a, associated with a partitioning operation that includes partitioning a title 300 from a document 122; partitioning criterion "b" 126b, associated with a partitioning operation that includes partitioning content of a document 122 into a plurality of sections based on paragraphs 306; partitioning criterion "c" 126c, associated with a partitioning operation that includes limiting a partition of a document 122 to X-number of units; partitioning criterion "d" 126d, associated with a partitioning operation that includes adding a content fragment to a different partition 140; or partitioning criterion "n" 126n, associated with a partitioning operation that includes an additional partitioning criterion, such as a user-defined partitioning criteria.

Figure 3C:
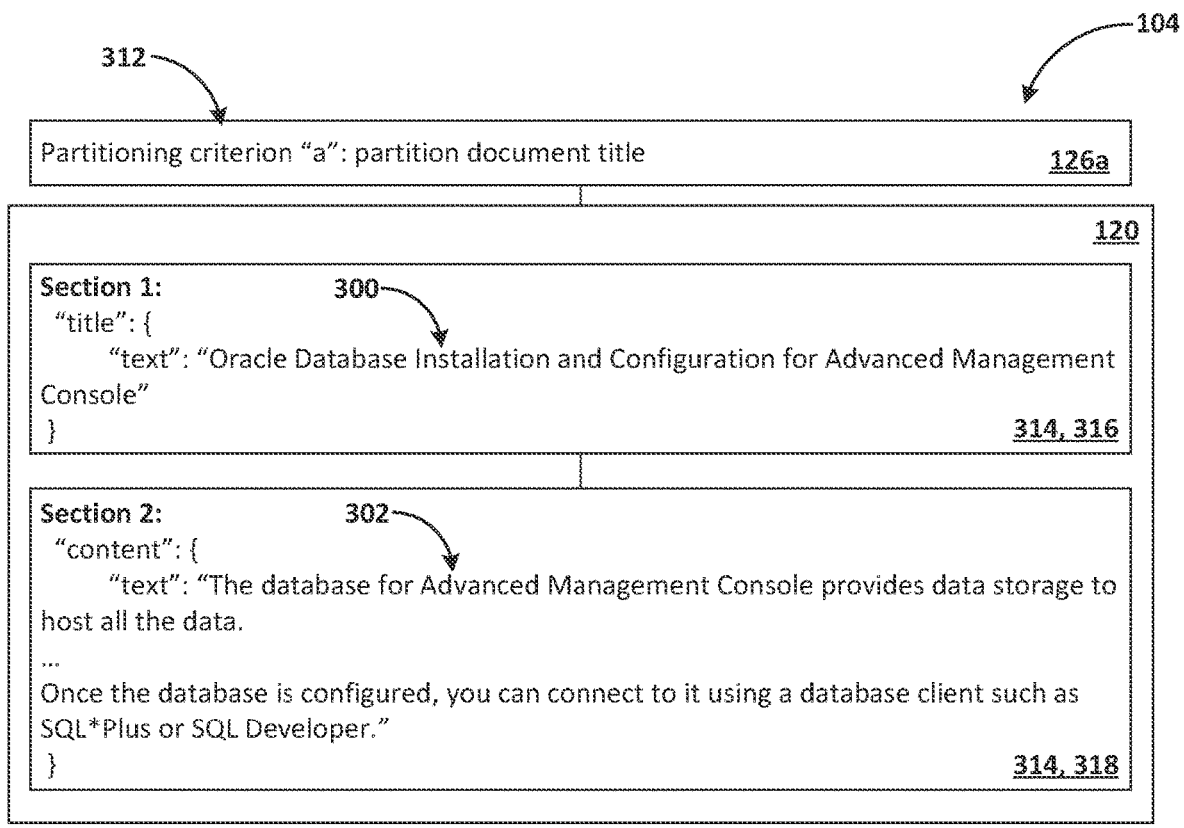
FIGS. 3C-3G illustrate example partitioning operations for partitioning documents into document partitions in accordance with one or more embodiments.

Referring to FIG. 3C, an example partitioning operation may include a title partitioning operation 312. The title partitioning operation 312 may include partitioning a title 300 from a document 122, such as from other content 302 of the document 122. The content 302 of the document may include textual content. The textual content may be organized into paragraphs. The title partitioning operation 312 may partition a document 122 into a plurality of sections 314 based on at least one partitioning criteria 126. The plurality of sections 314 may include a first section 316 and a second section 318. The first section 316 may include title 300 of the document 122. The second section 318 may include content 302, such as textual content, of the document 122. The partitioning module 114 may execute the title partitioning operation 312 by identifying indicia within a document 122 to represent the title 300, and partitioning the title 300 from the document 122 based on the indicia. By way of example, the indicia may include at least one of: markup language elements, encodings, declarations, or metadata.

Figure 3D:
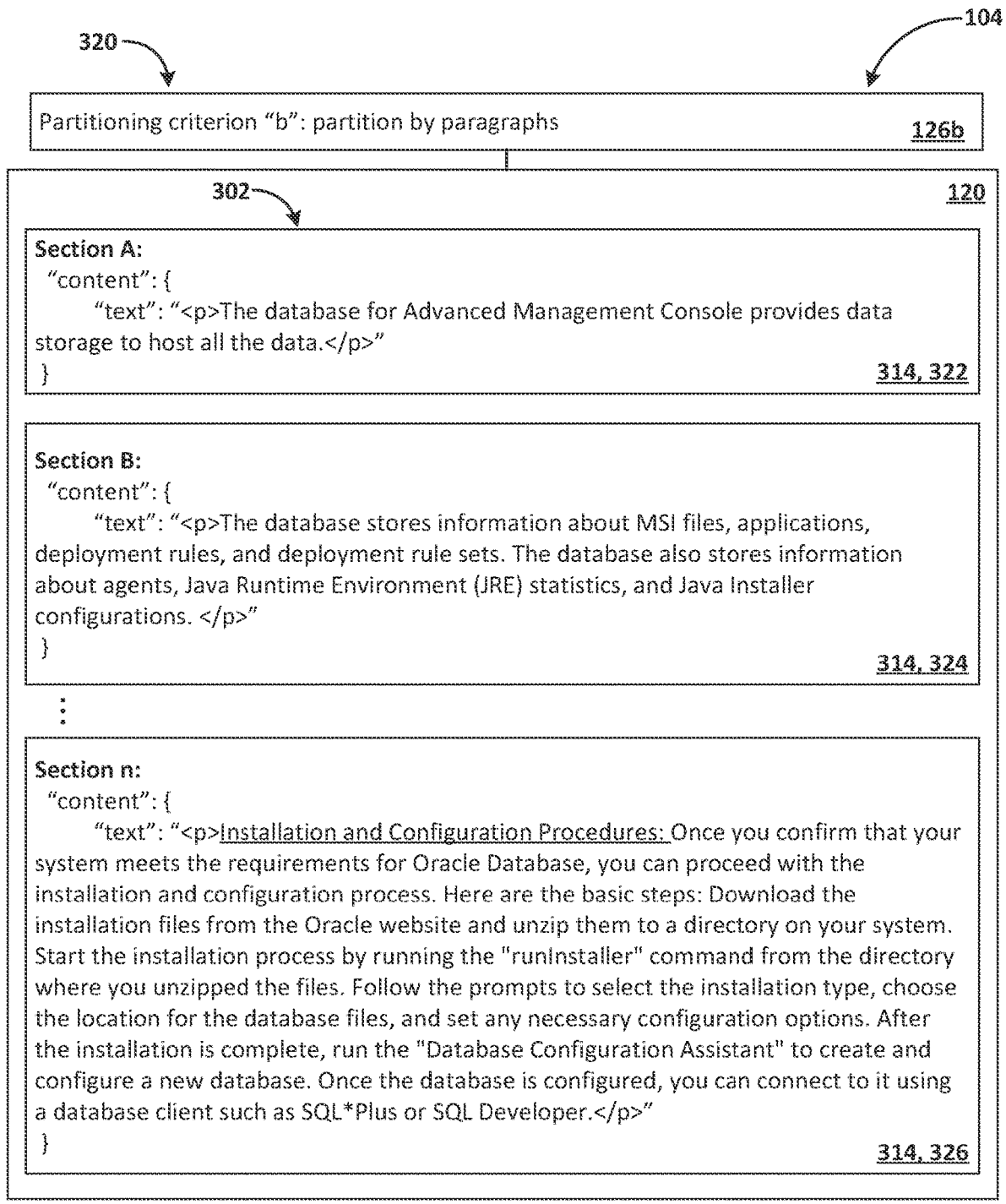

Referring to FIG. 3D, an example partitioning operation may include a paragraph partitioning operation 320. The paragraph partitioning operation 320 may include partitioning a document 122 into a plurality of sections 314 based on paragraphs 306 of the document. In one example, each of the plurality of sections 314 may include content 302, such as textual content, that corresponds to a particular paragraph 306 of the document 122. The paragraph partitioning operation 320 may partition content 302 of a document 122 into a plurality of sections 314 based on at least one partitioning criteria 126. The plurality of sections 314 may include a first paragraph 322, a second paragraph 324, and a third paragraph 326. The partitioning module 114 may execute the paragraph partitioning operation 320 by identifying indicia within a document 122 to represent sections 314 of the document 122, and forming respective sections 314 based on the indicia. The indicia may identify a start or end of a section 314. By way of example, the indicia may include at least one of: markup language elements, encodings, declarations, or metadata.

Figure 3E:
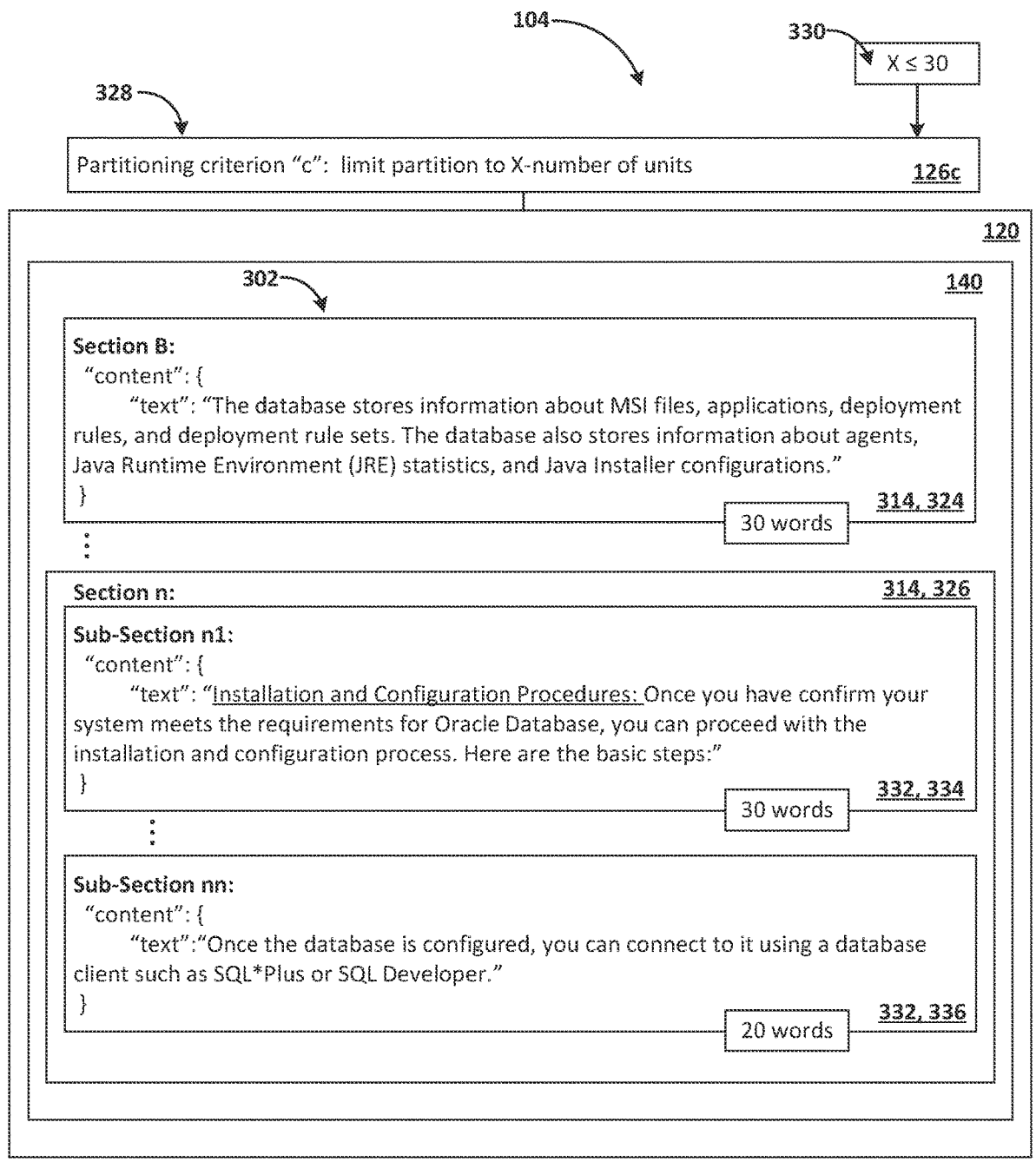

Referring to FIG. 3E, an example partitioning operation may include a size-limit operation 328. The size-limit operation 328 may include limiting one or more partitions 140 of a document 122 to X-number of units. The partitioning module 114 may execute the size-limit operation 328 by reference to API configuration settings.

The size-limit operation 328 may reference a size-limit operator 330 to determine the size-limit, such as the number of units, for the partitions 140. In one example, each of the plurality of sections 314 may include content 302, such as textual content, that is limited to X-number of units, for example, in accordance with the size-limit operator 330. The size limit of the size limit operator 328 may define a limit for at least one of: words, characters, lines, bytes, or Unicode points.

In one example, the size limit may be a range that corresponds to from about 25 words to about 100 words, or a value within the range. For example, the size limit may be a range of from 25 words to 100 words, or a value within the range. Additionally, or in the alternative, the size limit may be one of characters, lines, bytes, or Unicode points, that corresponds to a range of from about 25 words to about 100 words, or that corresponds to a value within the range. By way of example, as shown in FIG. 3E, the size-limit operator 328 may limit the partitions 140 to less than or equal to 30 words.

In one example, a section 314 that has a number of units within the size-limit proscribed by the size-limit operator 330 may remain unchanged as a result of the size-limit operation 328. For example, as shown in FIG. 3E (and with further reference to FIG. 3D), the first paragraph 322 resulting from the paragraph partitioning operation 320 described with reference to FIG. 3D has 30 words, and as such, the number of units in the first paragraph 322 remains at 30 words following the size-limit operator 328.

In one example, a section that has a number of units that exceeds the size-limit proscribed by the size-limit operator 330 may be partitioned into a plurality of sub-sections 332. For example, as shown in FIG. 3E (and with further reference to FIG. 3D), the second paragraph 324 has a number of units in excess of the 30-word size-limit proscribed by the size-limit operator 330. The size-limit operator 328 may partition the second paragraph 324 into a first sub-section 334 and a second sub-section 336, as shown in FIG. 3E. The first sub-section 334 may have 30 words, which meets the 30-word size-limit proscribed by the size-limit operator 330. The second sub-section 336 may have 20 words, which also meets the 30-word size-limit proscribed by the size-limit operator 330. In one example, a sub-section 332 may have less than the number of units proscribed by the size-limit operator 330 based on the sub-section representing the remaining units in the sub-section. For example, the 20 words in the second sub-section 336 represent the last 20 words of the second paragraph 324. Additionally, or in the alternative, a sub-section 332 may have less than the number of units proscribed by the size-limit operator 330 based on one or more additional partitioning operations executed to generate the sub-section 332.

Figure 3F:
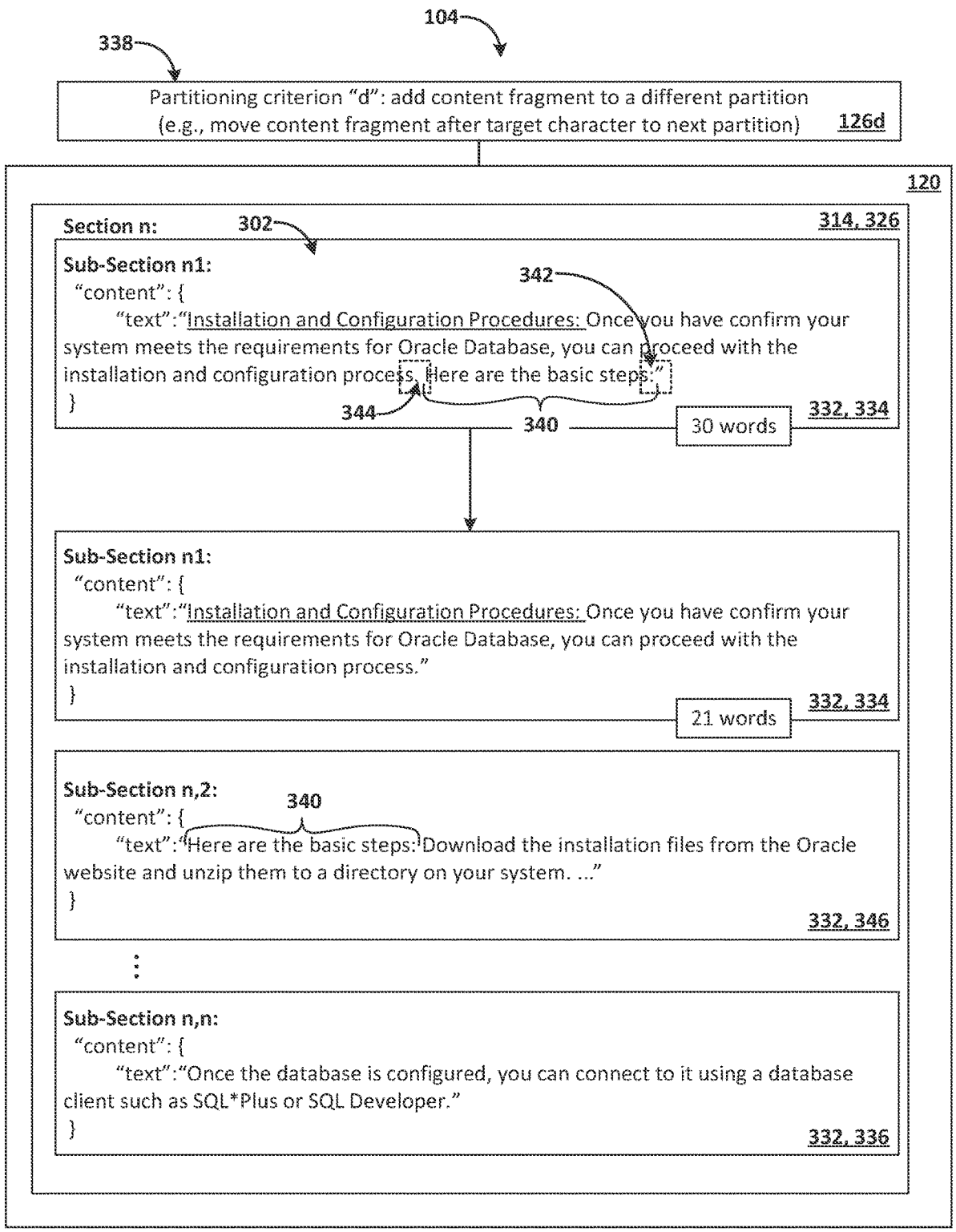
Figure 3G:
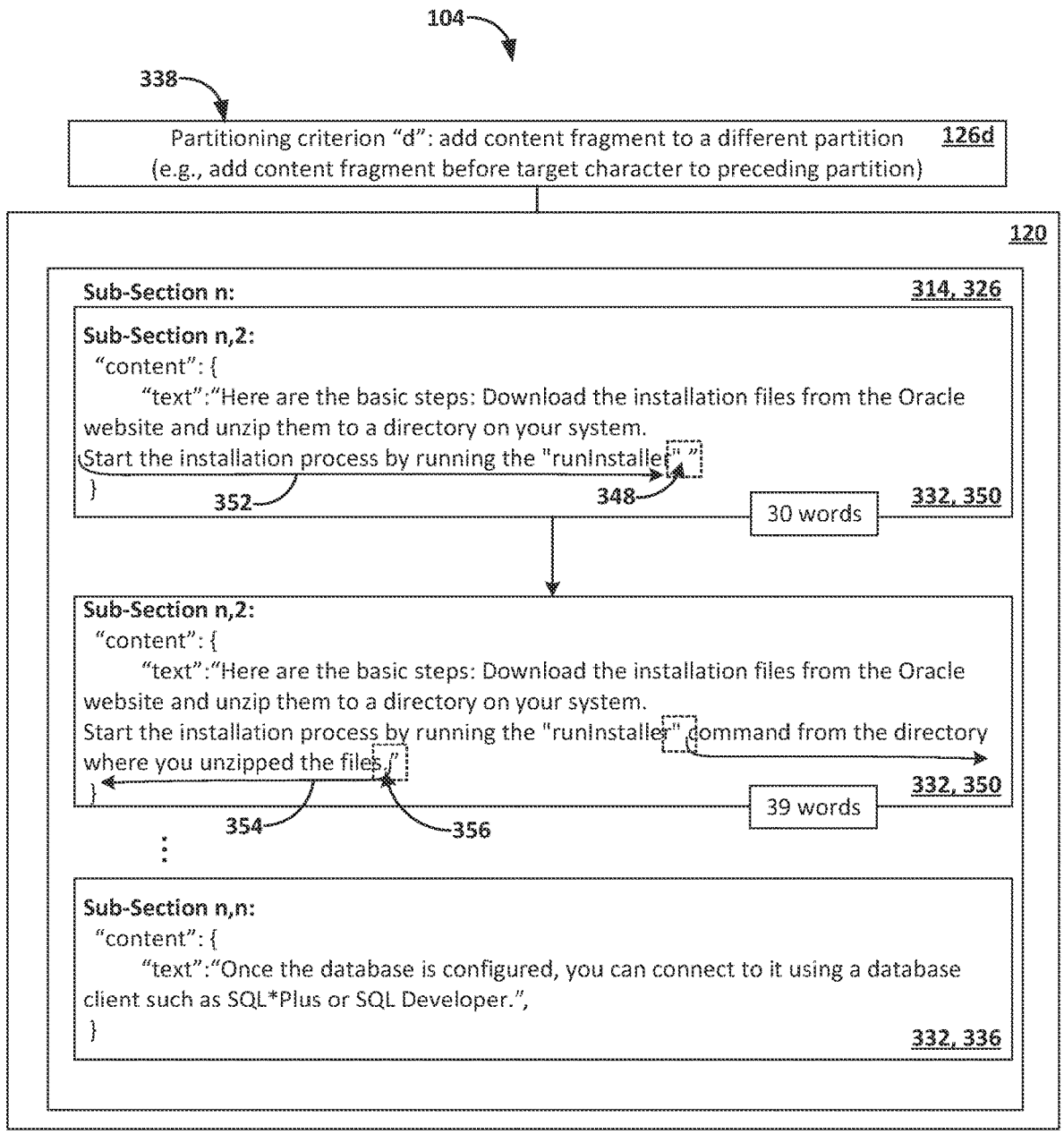

Referring to FIGS. 3F and 3G, an example partitioning operation may include one or more content fragment moving operations 338. A content fragment moving operation 338 may include identifying a content fragment in a partition 140 and adding the content fragment to another partition 140, for example, by moving or copying the content fragment. In one example, the content fragment moving operation 338 may include deleting a content fragment from a partition 140, for example, in connection with moving the content fragment to the other partition 140. The term "content fragment" refers to a portion of content 302 in a partition 140 that is separated from another portion of content as a result of a partitioning operation. By way of example, a content fragment may include at least part of: a sentence, a phrase, a clause, a word, or a paragraph. Additionally, or in the alternative, a content fragment may include an item of a list, category, or group. In one example, a content fragment may be identified by one or more target characters, such as one or more punctuation marks, that indicates a portion of content 302 in a partition 140 has been fragmented from content 302 in another partition 140.

By way of illustration, as shown in FIG. 3F, a sub-section 332 of a document 122 may include a content fragment 340. The content fragment 340 may be identified by a punctuation mark representing a first target character 342 located at the end of the sub-section 332 and a second target character 344 preceding the first target character 342. In the example shown, the first target character 342 is a colon punctuation mark. The first target character 342 at least partially identifies the content fragment 340 because the presence of the colon punctuation mark at the end of the sub-section 332 indicates that the document 122 may include further content 302 following the colon punctuation mark that may be associated with the content preceding the colon punctuation mark, and that such further content 302 is not contained in the sub-section 332 concluding with the colon punctuation mark. The second target character 344 at least partially identifies the content fragment 340 at least because the period punctuation mark preceding the first target character 342 delimits a phrase preceding the first target character 342. The content fragment 340 may include the phrase between the first target character 342 and the second target character 344.

As shown in FIG. 3F, the content moving operation 338 may include moving or copying the content fragment 340 to a different partition 140, such as to a subsequent partition 140. The content of the subsequent partition 140 may be located in the document 122 adjacent to the content fragment 340, such as immediately subsequent to the content fragment 340. For example, as shown, the content fragment 340 may be moved or copied from the first sub-section 334 to a subsequent sub-section 346. In one example, as shown, the content fragment 340 may be deleted from the first sub-section 334. Deleting the content fragment 340 may reduce the number of units relative to a size-limit operator 330 (FIG. 3E). For example, after deleting the content fragment 340, the first sub-section may have 21 words, representing a reduction from the 30-word size-limit proscribed by the size-limit operator 330 described with reference to FIG. 3E.

As another example, as shown in FIG. 3G, a content fragment 340 may be identified by a target character represented by an absence of a punctuation mark, such as a space. For example, as shown in FIG. 3G, a content fragment 340 may be identified by a space representing a third target character 348 located at the end a third sub-section 350. The third target character 348 at least partially identifies the content fragment 340 in the third sub-section 350 because the space at the end of the third sub-section 350 indicates that the document 122 may include further content 302 that may be associated with the content 302 preceding the space, and that such further content 302 is not contained in the third sub-section 350 concluding with the space. As shown, a first content fragment 352 may be combined with a second content fragment 354. The second content fragment 354 may be identified by a fourth target character 356, such as a period punctuation mark, indicating the end of a sentence.

As shown in FIG. 3G, in at least one example, adding the second content fragment 354 to the third sub-section may increase the number of units relative to a size-limit operator 330 (FIG. 3E). In one example, a content fragment moving operations 338 may be allowed to exceed the size-limit operator 330. For example, after adding the third content fragment 354, the third sub-section 350 may have 39 words, in excess of the 30-word size-limit proscribed by the size-limit operator 330 described with reference to FIG. 3E. In one example, one or more partitions 140, such as one or more sub-sections 332, may have a particular size that is greater than the size limit determined by the size-limit operator 330. For example, a subsequent size-limit operator may be applied with respect to content fragment moving operation 338, for example, to allow the number of units representing a partition 140 to be increased in accordance with the subsequent size-limit operator, as a result of adding the content fragment 340 to the partition 140.

Figure 3H:
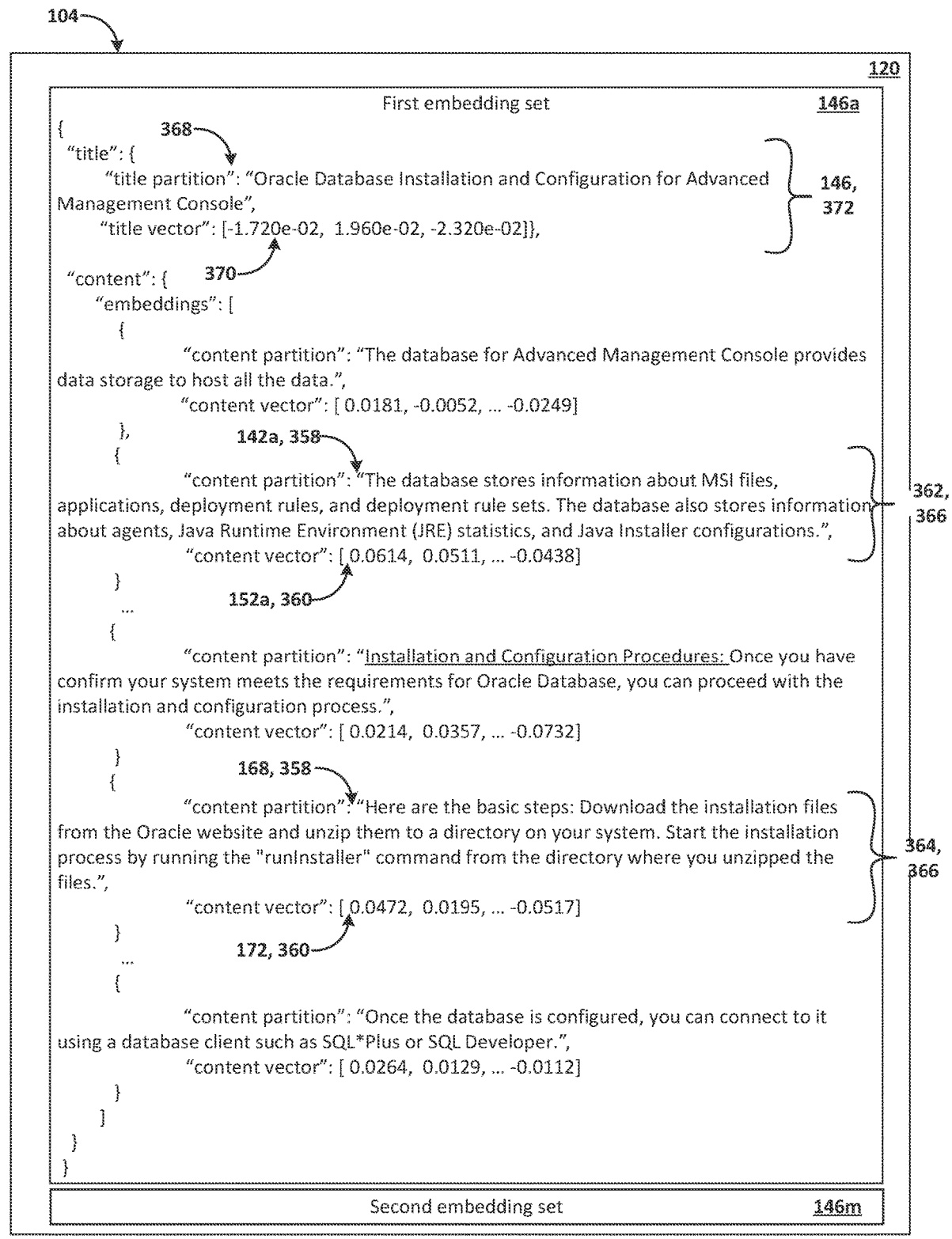
FIG. 3H illustrates an example set of document partitions embedded with feature vectors in accordance with one or more embodiments.

Referring to FIG. 3H, example embeddings 146 are further described. In one example, as shown in FIG. 3H, an embedding 146 may include a content partition 358 resulting from a partitioning operation that partitions content 302 of a document 122 based on at least one partitioning criteria 126, and a content vector 360 resulting from an embedding function executed on the content partition 358. An embedding 146 that includes a content partition 358 and a content vector 360 may sometimes be referred to as a "content embedding."

By way of example, as shown in FIG. 3H, a data corpus 120 may include a first embedding set 146a and a second embedding set 146m. The first embedding set 146a may include a first embedding 362 and a second embedding 364. The first embedding set 146a may include a first document partition 142a and a first feature vector 152a corresponding to the first document partition 142a. In one example, the first embedding 362 may be a content embedding 366, in which the first document partition 142a may be a content partition 358, and the first feature vector 152a may be a content vector 360. The second embedding 364 may include a second document partition 142n and a second feature vector 152n corresponding to the second document partition 142n. In one example, the second embedding 364 may be a content embedding 366, in which the second document partition 142*n* may be a content partition 358, and the second feature vector 152*n* may be a content vector 360.

As further shown in FIG. 3H, an embedding 146 may include a title partition 368 resulting from a partitioning operation that partitions a title 300 from a document 122, and a title vector 370 resulting from an embedding function executed on the title partition 358. An embedding that includes a title partition 368 and a title vector 370 may sometimes be referred to as a "title embedding." By way of example, as shown in FIG. 3H, an embedding set 146 may include a title embedding 372 along with at least one content embedding 366. Additionally, or in the alternative, a title embedding 372 may be included in the data corpus 120 in a manner that is separate from another embedding set 146 that includes content embeddings 366.

In one example, a content fragment moving operations 338 may include determining a size limit, such as for a size-limit operation 328, in a flexible manner based on a location of at least one target character. For example, the content fragment moving operations 338 may include determining a target character that meets a proximity threshold representing a smallest character distance from a character corresponding to a size limit, and selecting the target character to represent a location for partitioning a particular section 314 into a particular plurality of sub-sections 332.

In one example, a target character may be represented by an encoding, a declaration, or a markup language element, corresponding to a particular punctuation mark. The particular punctuation mark may be one of: a period, a question mark, an exclamation point, a colon, a semicolon, an ellipses, a dash, a bracket, a parenthesis, a dash, a hyphen, a comma, a quotation mark, a number sign, a percent sign, an ampersand, an apostrophe, an asterisk, a slash, an at-symbol, an underscore, a vertical bar, a tilde, a non-breaking space, an inverted question mark, an inverted exclamation mark, a section sign, a paragraph sign, a middle dot, a dagger, or a bullet.

In one example, a content fragment moving operation 338 may include at least one of: (a) copying or deleting a first content fragment 352 from a first sub-section 334 and adding the first content fragment 340 to a subsequent sub-section 346, (b) copying or deleting a second content fragment 354 of the subsequent sub-section 346 and adding the second content fragment 354 to the first sub-section 334, or (c) defining an additional sub-section, copying or deleting the first content fragment 352 and the second content fragment 354, and adding the first content fragment 352 and the second content fragment 354 to the additional sub-section. In one example, the content fragment moving operation 338 may determine how to combine a first content fragment 352 with a second content fragment 354 at least in part by selecting for lower resulting sizes of at least two sub-sections 332, or by selecting for resulting semantic-relatedness of the content 302 in at least one sub-section 332.

Figure 4:
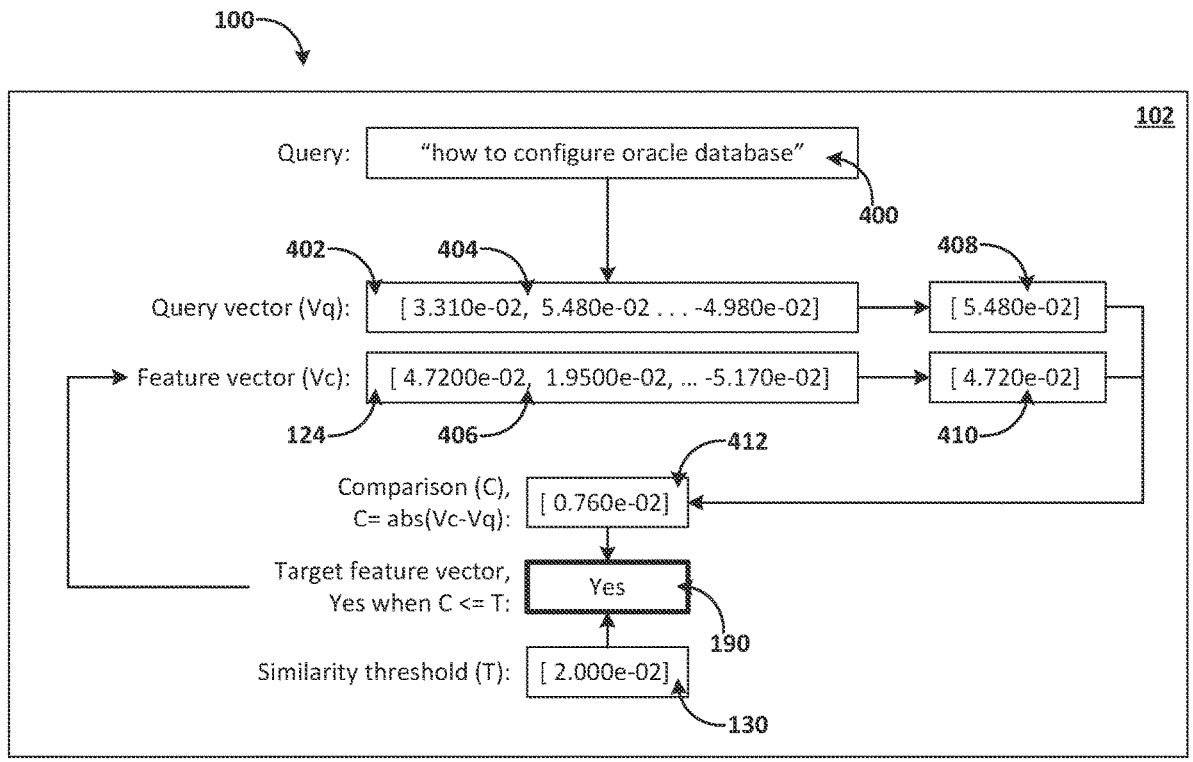
FIG. 4 illustrates example query operations in accordance with one or more embodiments.

Referring to FIG. 4, example query operations, including comparison of feature vectors to query vectors, are further described. The query operations described with reference to FIG. 4 may be performed by the system 100, including at least in part by the search management system 102. In one example, the query operations may be performed at least in part by a search engine 118. The query operations may include comparing a query vector to a set of feature vectors, including one or more content vectors 360, and optionally, a title vector 370.

As shown in FIG. 4, responsive to a query 400, a query vector 402 may be generated. The query vector 402 may be generated by the embedding engine 116. Additionally, or in the alternative, responsive to the query 400, the query vector 402 may be compared to at least one feature vector 124. A query vector 402 may include a plurality of dimensions. A query vector 402 may include a plurality of query vector-values 404 that respectively correspond to a particular dimension of the query vector 402. A feature vector 124 may include a plurality of dimensions. A feature vector 124 may include a plurality of feature vector-values 406 that respectively correspond to a particular dimension of the feature vector 124. In one example, a comparison of a query vector 402 to a feature vector 124 may include determining at least one query vector comparison-value 408 and at least one feature vector comparison-value 410 for comparison.

The query vector comparison-value 408 may be determined based at least in part on the plurality of query vector-values 404. In one example, the query vector comparison-value 408 may include a maximum query vector-value 404. Additionally, or in the alternative, the query vector comparison-value 408 may include at least one statistical operator based on the query vector-values 404, such as at least one of: an average, a median, or a mean.

The feature vector comparison-value 410 may be determined based at least in part on the plurality of feature vector-values 406. In one example, the feature vector comparison-value 410 may include a maximum feature vector-value 406. Additionally, or in the alternative, the feature vector comparison-value 410 may include at least one statistical operator based on the feature vector-values 406, such as at least one of: an average, a median, or a mean.

A comparison value 412 may be determined based on the comparison of the query vector comparison-value 408 to the feature vector-comparison-value 410. In one example, the comparison value 412 may represent a difference, such as an absolute value of the difference, between the query vector comparison-value 408 and the feature vector-comparison-value 410.

Referring still to FIG. 4, in at least one example, the comparison value 412 may be compared to a similarity threshold 130. A comparison value 412 that meets or exceeds the similarity threshold 130 may be identified as a target feature vector 190. In one example, the similarity threshold 130 may represent a maximum difference between a query vector comparison-value 408 and feature vector-comparison-value 410 for which the feature vector 124 may be considered sufficiently similar to the query vector 402 such that the partition 140 corresponding to the feature vector 124 may be included in a query result. In one example, the comparison of the query vector comparison-value 408 to the feature vector-comparison-value 410 may be repeated for a plurality of feature vectors 124 that respectively correspond to one of a plurality of document partitions 140. In one example, the target feature vector may be determined for the feature vector 124 that represents a closest match to the query vector 402. For example, the target feature vector may correspond to the feature vector 124 that yields a comparison value 412 that is closest to zero (0). In one example, the query vector 402 may be compared feature vectors 124 in a plurality of sets of feature vectors 124 to identify a target feature vector that meets a similarity threshold 130 with the query vector 402. The target feature vector may be a particular feature vector 124 from a particular set of feature vectors from among the sets of feature vectors. The particular set of feature vectors to which the target feature vector corresponds may represent a particular document 122 from a set of documents. Additionally, or in the alternative, the target feature vector may represent a target partition of from among a set of document partitions 140 corresponding to the particular document 122.

Figure 5:
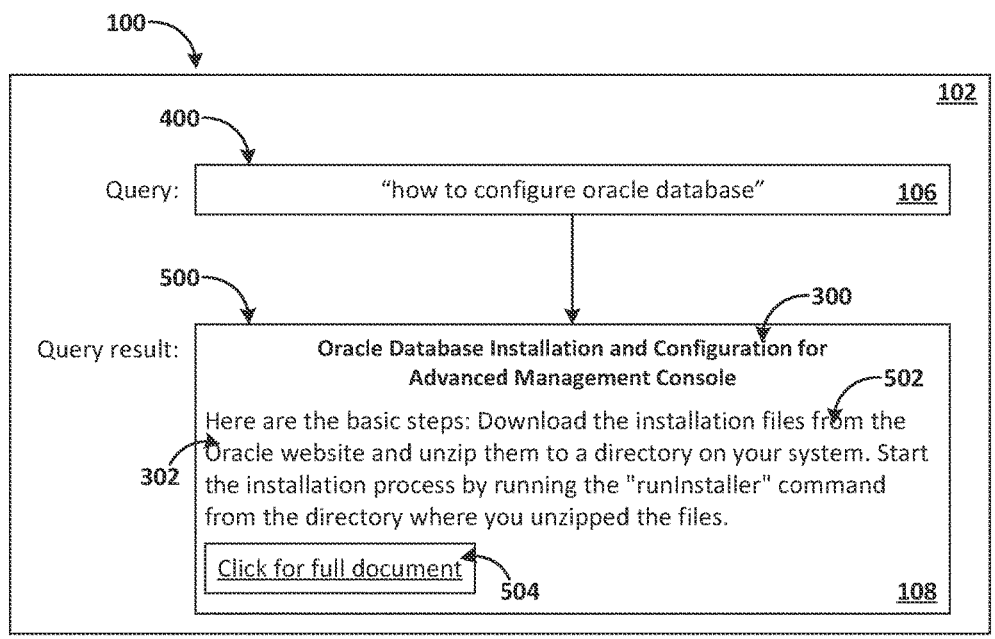
FIG. 5 illustrates an example query and a corresponding query result in accordance with one or more embodiments.
Figure 6:
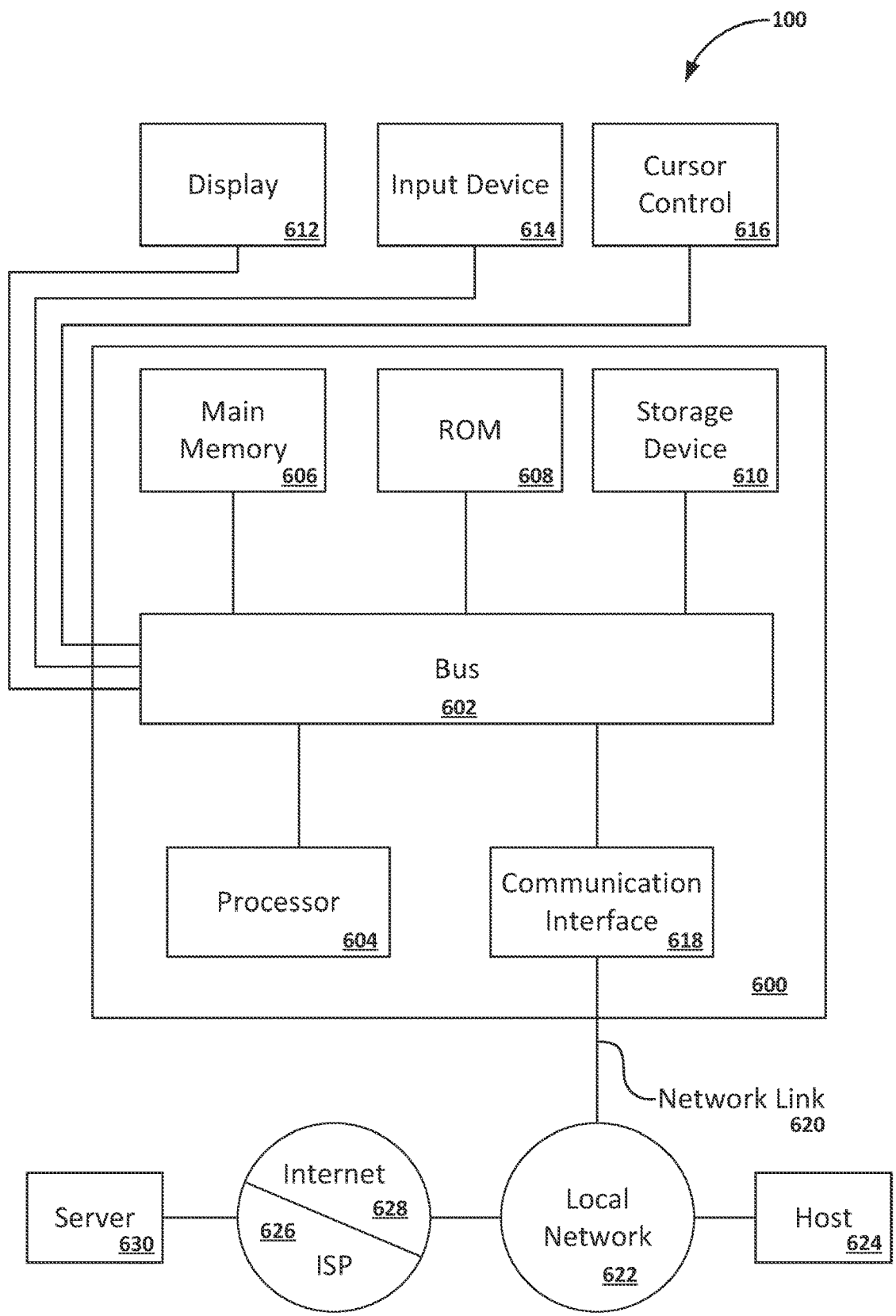
FIG. 6 shows a block diagram that illustrates a computer system in accordance with one or more embodiments.

Referring to FIG. 5, an example query result 500 is shown. The search management system 102 may receive a query 400 to search the data repository 104, such as from an input 106 to the search management system 102. The input may be received from the user interface 110 and/or the communications interface 112. A query result 500 may be determined, such as the query 400 described with reference to FIG. 4. The query result 500 may represent an output 108 of the search management system 102. As shown, the query result 500 may include content 302 corresponding to a partition 140. The content may include a target partition 502. The target partition 502 may represent a partition 140 corresponding to the target feature vector 190. Additionally, or in the alternative, the query result 500 may include a title 300 corresponding to a document 122. The title 300 may be included in association with the target partition 502, and/or the title 300 may itself represent a target partition 502. Additionally, or in the alternative, the query result 500 may include the document 122 in its entirety, or a hyperlink 504 to the document 122.

In one example, a query result 500 may include or represent a document 122 for which a title vector satisfies similarity threshold 130 but none of the content vectors satisfy the similarity threshold 130. Additionally, or in the alternative, a query result 500 may include or represent a document 122 for which at least one content vector 360 satisfies the similarity threshold 130 but the title does not satisfy the similarity threshold 130.

In one example, a query result 500 may include or represent a document 122 for which both the title vector 370 and at least one content vector 360 satisfies the similarity threshold 130. In the event of a document 122 for which both the title vector 370 and at least one content vector 360 satisfies the similarity threshold 130, a ranking multiplier may be applied to the document 122 represented in the query result 500. The ranking multiplier may boost the ranking of a first document 122 relative to a second document 122 represented in the query result 500 to which the ranking multiplier has not been applied. For example, the title vector 370 representing the second document 122 may satisfy the similarity threshold 130, whereas a plurality of content vectors 360 representing the second document 122 may not satisfy the similarity threshold 130. Alternatively, at least one of the content vectors 360 representing the second document 122 may satisfy the similarity threshold 130, whereas the title vector representing the second document may not satisfy the similarity threshold 130. In one example, a value of the title vector 370 representing the second document 122 may be larger than a value of the title vector 370 representing the first document 122, and a ranking of the first document 122 resulting from the ranking multiplier may exceed a ranking of the second document without the ranking multiplier. Alternatively, a value of a content vector 360 representing the second document 122 may be larger than a value of any one or more of the content vectors 360 representing the first document 122, and a ranking of the first document 122 resulting from the ranking multiplier may exceed a ranking of the second document 122 without the ranking multiplier.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary data or other intermediate information during execution of instructions to be executed by processor 604. Such instructions, when stored in non-transitory storage media accessible to processor 604, transform the computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Computer Networks and Cloud Networks

In one or more embodiments, the PR system is connected to, or distributed across, a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. One or more non-transitory computer-readable media comprising computer-executable instructions that, when executed by one or more processors, cause performance of operations, the operations comprising:
   executing a partitioning process for partitioning a document into a plurality of document partitions, wherein the partitioning process comprises:
      defining, in an application implemented on a computing device, a first partitioning criterion applicable to a partitioning operation;
      defining, in the application, a first combining operation applicable to a triggering condition for combining content that satisfies the triggering condition, wherein the triggering condition comprises a threshold level of contextual relatedness;
      executing the partitioning operation comprising partitioning the document into at least a first candidate partition and a second candidate partition based on the first partitioning criterion;
   identifying in the first candidate partition, a first content fragment representing a first portion of content having been separated, by the partitioning operation, from at least a second portion of the content;
   executing the application to determine that the triggering condition is satisfied for combining the first content fragment of the first candidate partition with at least the second portion, wherein the determining that the triggering condition is satisfied comprises:
      determining that a relationship between the first content fragment and the second portion of the content meets the threshold level of contextual relatedness;
   responsive to the determining that the triggering condition is satisfied: combining, based on the first combining operation, the first content fragment of the first candidate partition with at least the second portion of the content to generate a first document partition comprising the first content fragment and at least the second portion of the content; and
   wherein at least a portion of the document, including the first document partition, is retrieved in response to a query.

2. The one or more non-transitory computer-readable media of claim 1, wherein the triggering condition comprises:
   a relationship between the first content fragment and the second portion of the content that meets a threshold level of similarity.

3. The one or more non-transitory computer-readable media of claim 1, wherein the triggering condition comprises:
   a relationship between the first content fragment and the second portion of the content that meets a set of one or more contextual similarity criteria.

4. The one or more non-transitory computer-readable media of claim 1, wherein the operations further comprise:
   executing an embedding function on the plurality of document partitions to generate a set of feature vectors, wherein a first feature vector, of the set of feature vectors, represents the first document partition;
   wherein, in response to the query, at least the portion of the document, including the first document partition, is returned responsive to determining that the first feature vector meets a similarity threshold in relation to a second feature vector representing the query.

5. The one or more non-transitory computer-readable media of claim 1, wherein combining the first content fragment of the first candidate partition with at least the second portion of the content comprises:
   removing the first content fragment from the first candidate partition and adding the first content fragment to the second portion of the content to generate the first document partition.

6. The one or more non-transitory computer-readable media of claim 1, wherein the operations further comprise:
   deleting the first content fragment from the first candidate partition to generate a third document partition comprising at least a third portion of the first candidate partition.

7. The one or more non-transitory computer-readable media of claim 1, wherein the partitioning process further comprises:
   identifying in the second candidate partition, a second content fragment representing a part of the second candidate partition;
   combining the first content fragment of the first candidate partition with the second content fragment of the second candidate partition to generate the first document partition.

8. The one or more non-transitory computer-readable media of claim 1, wherein the partitioning process further comprises:
   identifying in the second candidate partition, a second content fragment representing a part of the second candidate partition;
   combining the second content fragment of the second candidate partition with at least a third portion of the first candidate partition to generate a second document partition comprising the second content fragment and at least the third portion of the first document partition.

9. The one or more non-transitory computer-readable media of claim 8, wherein the operations further comprise:
   executing an embedding function on the plurality of document partitions to generate a set of feature vectors, wherein a first feature vector, of the set of feature vectors, represents the first document partition, and wherein a second feature vector, of the set of feature vectors, represents the second document partition;

wherein, in response to the query, at least the portion of the document, including the first document partition, is returned responsive to determining that the first feature vector meets a similarity threshold in relation to a third feature vector representing the query;

wherein the second document partition is not returned based on the similarity threshold being unmet with respect to the second feature vector in relation to the third feature vector.

10. The one or more non-transitory computer-readable media of claim 1, wherein identifying the first content fragment comprises:

identifying a target character in the first candidate partition, wherein the target character is indicative of the first portion of content of the first candidate partition having been fragmented, by the partitioning operation, from the second portion of the content.

11. The one or more non-transitory computer-readable media of claim 10, wherein identifying the target character in the first candidate partition comprises:

selecting the target character, from a set of candidate target characters, based on a character distance from a character corresponding to a size limit for a particular document partition, of the plurality of document partitions.

12. The one or more non-transitory computer-readable media of claim 11, wherein the operations further comprise:

removing, based on a second partitioning criterion, the first content fragment from the first candidate partition to generate a second document partition comprising at least a third portion of the first candidate partition, wherein a first size corresponding to the first candidate partition exceeds the size limit, and wherein a second size corresponding to the second document partition is within the size limit.

13. The one or more non-transitory computer-readable media of claim 10, wherein the target character comprises at least one of: an encoding, a declaration, or a markup language element.

14. The one or more non-transitory computer-readable media of claim 10, wherein the target character represents at least one of: a punctuation mark or a space.

15. A method, comprising:

executing, by at least one device including one hardware processor, a partitioning process for partitioning a document into a plurality of document partitions, wherein the partitioning process comprises:

defining, in an application implemented on a computing device, a first partitioning criterion applicable to a partitioning operation;

defining, in the application, a first combining operation applicable to a triggering condition for combining content that satisfies the triggering condition, wherein the triggering condition comprises a threshold level of contextual relatedness;

executing the partitioning operation comprising partitioning the document into at least a first candidate partition and a second candidate partition based on the first partitioning criterion;

identifying in the first candidate partition, a first content fragment representing a first portion of content having been separated, by the partitioning operation, from at least a second portion of the content;

executing the application to determine that the triggering condition is satisfied for combining the first content fragment of the first candidate partition with at least the second portion, wherein the determining that the triggering condition is satisfied comprises: determining that a relationship between the first content fragment and the second portion of the content meets the threshold level of contextual relatedness;

responsive to the determining that the triggering condition is satisfied: combining, based on the first combining operation, the first content fragment of the first candidate partition with at least the second portion of the content to generate a first document partition comprising the first content fragment and at least the second portion of the content; and wherein at least a portion of the document, including the first document partition, is retrieved in response to a query.

16. The method of claim 15, wherein detecting the triggering condition comprises:

a relationship between the first content fragment and the second portion of the content that meets a threshold level of similarity.

17. The method of claim 15, wherein detecting the triggering condition comprises:

a relationship between the first content fragment and the second portion of the content that meets a contextual similarity criteria.

18. The method of claim 15, further comprising:

executing an embedding function on the plurality of document partitions to generate a set of feature vectors, wherein a first feature vector, of the set of feature vectors, represents the first document partition;

wherein, in response to the query, at least the portion of the document, including the first document partition, is returned responsive to determining that the first feature vector meets a similarity threshold in relation to a second feature vector representing the query.

19. The method of claim 15, wherein combining the first content fragment of the first candidate partition with at least the second portion of the content comprises:

removing the first content fragment from the first candidate partition and adding the first content fragment to the second portion of the content to generate the first document partition.

20. A system, comprising:

at least one hardware processor;

wherein the system is configured to execute operations, using the at least one hardware processor, the operations comprising:

executing a partitioning process for partitioning a document into a plurality of document partitions, wherein the partitioning process comprises:

defining, in an application implemented on a computing device, a first partitioning criterion applicable to a partitioning operation;

defining, in the application, a first combining operation applicable to a triggering condition for combining content that satisfies the triggering condition, wherein the triggering condition comprises a threshold level of contextual relatedness;

executing the partitioning operation comprising partitioning the document into at least a first candidate partition and a second candidate partition based on the first partitioning criterion;

identifying in the first candidate partition, a first content fragment representing a first portion of content having been separated, by the partitioning operation, from at least a second portion of the content;

executing the application to determine that the triggering condition is satisfied for combining the first content fragment of the first candidate partition with at least the second portion, wherein the determining that the triggering condition is satisfied comprises: determining that a relationship between the first content fragment and the second portion of the content meets the threshold level of contextual relatedness;

responsive to the determining that the triggering condition is satisfied: combining, based on the first combining operation, the first content fragment of the first candidate partition with at least the second portion of the content to generate a first document partition comprising the first content fragment and at least the second portion of the content; and wherein at least a portion of the document, including the first document partition, is retrieved in response to a query.

\* \* \* \* \*

UNITED STATES PATENT AND TRADEMARK OFFICE
CERTIFICATE OF CORRECTION

| | | |
|---|---|---|
| PATENT NO. | : 12,204,574 B2 | Page 1 of 1 |
| APPLICATION NO. | : 18/634293 | |
| DATED | : January 21, 2025 | |
| INVENTOR(S) | : Matei et al. | |

It is certified that error appears in the above-identified patent and that said Letters Patent is hereby corrected as shown below:

In the Specification

In Column 4, Line 50, delete "and or" and insert -- and/or --, therefor.

In Column 7, Line 37, delete "152a. 152n" and insert -- 152a . . . 152n --, therefor.

In Column 8, Line 45, delete "Sentence Transformers." and insert -- SentenceTransformers. --, therefor.

In Column 10, Lines 34-35, delete "E-approximate" and insert -- ε-approximate --, therefor.

In Column 11, Line 14, delete "3A-3J," and insert -- 3A-3H, --, therefor.

Signed and Sealed this
Eighth Day of April, 2025

Coke Morgan Stewart
*Acting Director of the United States Patent and Trademark Office*